(12) United States Patent
Yagasaki et al.

(10) Patent No.: US 7,392,196 B2
(45) Date of Patent: Jun. 24, 2008

(54) MEMBERSHIP QUALIFICATION PROCESSING SYSTEM AND METHOD THEREOF

(75) Inventors: Isao Yagasaki, Kawasaki (JP); Toshimitsu Kuroda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 180 days.

(21) Appl. No.: 09/749,720

(22) Filed: Dec. 28, 2000

(65) Prior Publication Data

US 2001/0034604 A1 Oct. 25, 2001

(30) Foreign Application Priority Data

Apr. 21, 2000 (JP) ............................. 2000-121582

(51) Int. Cl.
*G06Q 10/00* (2006.01)
(52) U.S. Cl. .............................................. 705/1
(58) Field of Classification Search ................ 705/1, 705/7, 10, 14, 26, 27, 28, 29, 500, 8, 9, 16, 705/17, 35, 39
See application file for complete search history.

(56) References Cited

U.S. PATENT DOCUMENTS

| 5,774,868 | A | * | 6/1998 | Cragun et al. ................ 705/14 |
| 5,832,457 | A | * | 11/1998 | O'Brien et al. ............... 705/14 |
| 5,895,454 | A | * | 4/1999 | Harrington ................... 705/26 |
| 5,918,215 | A | * | 6/1999 | Yoshioka et al. .............. 705/30 |
| 5,999,914 | A | * | 12/1999 | Blinn et al. ................... 705/26 |
| 6,014,635 | A | * | 1/2000 | Harris et al. .................. 705/14 |
| 6,332,126 | B1 | * | 12/2001 | Peirce et al. .................. 705/14 |
| 6,430,539 | B1 | * | 8/2002 | Lazarus et al. ................ 705/10 |
| 6,466,918 | B1 | * | 10/2002 | Spiegel et al. ................ 705/27 |
| 6,505,168 | B1 | * | 1/2003 | Rothman et al. .............. 705/10 |
| 7,003,789 | B1 | * | 2/2006 | Linehan ......................... 725/1 |
| 7,013,286 | B1 | * | 3/2006 | Aggarwal et al. ............. 705/14 |

FOREIGN PATENT DOCUMENTS

| JP | 7-30666 | 1/1995 |
| JP | 8-235276 | 9/1996 |
| JP | 10-312437 | 11/1998 |
| JP | 11-161652 | 6/1999 |
| JP | 2000-020594 | 1/2000 |
| JP | 2002-515991 | 5/2002 |
| WO | 97/22073 | 6/1997 |
| WO | WO 98/06050 | * 2/1998 |

OTHER PUBLICATIONS

Notice of Grounds Rejection for Japanese Patent Application No. 2000-121582; mailed Jun. 20, 2006.

* cited by examiner

*Primary Examiner*—Igor N Borissov
(74) *Attorney, Agent, or Firm*—Staas & Halsey LLP

(57) ABSTRACT

A service system stores membership qualification conditions of a plurality of services. The service system selects a service that a user can use from those and displays the selected service. The service system references information of another service of which a user has already become a member and performs a membership qualification of the user on behalf of a server of each service.

9 Claims, 29 Drawing Sheets

| | |
|---|---|
| CERTIFICATE SER. NO. | USER 0001 |
| NAME | FUJITSU TARO |
| ADDRESS | TOKYO-TO, OOTA-KU |
| E-MAIL ADDRESS | XXX@XXX.JP |

FIG. 5

| CERTIFICATE SER. No. | USER 0001 |
|---|---|
| AVAILABLE SERVICE ID | SERVICE A<br>SERVICE B |

F I G. 6

| | |
|---|---|
| USER ID | AAA00000 |
| PASSWORD | XXXXXXXX |
| NAME | FUJITSU TARO |
| ADDRESS | TOKYO-TO, OOTA-KU |
| CERTIFICATE SER. NO. | USER 0001 |

FIG. 7

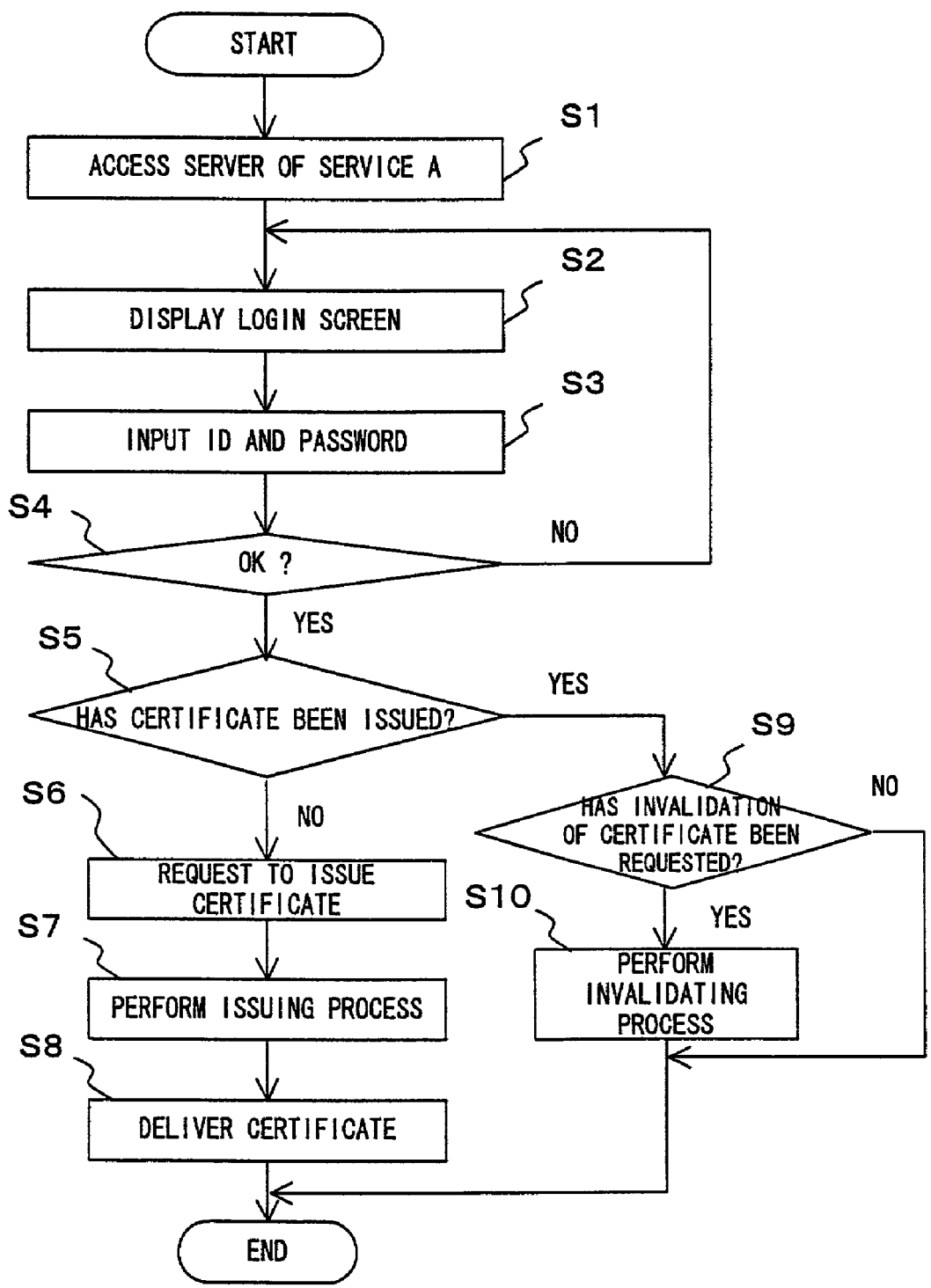
F I G. 8

| SERVICE ID | SERVICE A |
|---|---|
| COMPANY ID | a a a a a |
| CONDITION 1: SEX | ☐ MALE  ■ FEMALE <br> ☐ NOT CONCERNED |
| CONDITION 2: AGE | 40 YEARS OLD   OR UNDER |
| CONDITION 3: ANNUAL INCOME | ¥ 600 0,000   OR ABOVE |
| CONDITION 4: COMPANY OF EMPLOYMENT | ～ |
| ⋮ | ⋮ |
| CONDITION T: COMPANY OF EMPLOYMENT | ～ |
| SERVICE CATEGORY | ～ |
| SERVICE NAME | ～ |
| SERVICE SUMMARY | ～ |
| APPLICATION URL | ～ |
| MEMBERSHIP INQUIRY E-MAIL | ～ |

FIG. 12

| SERVICE ID | | SERVICE A |
|---|---|---|
| And check | QUALIFICATION CRITERIA | |
| | COMPANY ID | SERVICE ID |
| ◨ | aaaaa | ****B, ****C, |
| ■ | bbbbb | |
| | ccccc | ****D |

F I G. 1 3

SERVICES OF WHICH YOU CAN BECOME MEMBER WITH COMMON CERTIFICATING SYSTEM

● EACH SERVICE OF WHICH YOU HAVE BECOME MEMBER

> 1. ○○○ SERVICE: SINCE YEAR 00
>
> 2. ××× SERVICE: SINCE YEAR 00

● SERVICES OF WHICH YOU CAN NEWLY BECOME MEMBER

WITHOUT ANY CONDITION:

| | SERVICE CATEGORY | SERVICE NAME | SERVICE SUMMARY |
|---|---|---|---|
| 1. | | | |
| 2. | | | |
| 3. | | | |

WITH CONDITION:

| | SERVICE CATEGORY | SERVICE NAME | SERVICE SUMMARY | CONDITION |
|---|---|---|---|---|
| 1. | | | | |
| 2. | | | | |

FIG. 17

MEMBERSHIP QUALIFICATION INFORMATION

CERTIFICATE AUTHORITY WILL QUALIFY MEMBERSHIP OF USER USING COMMON CERTIFICATE FOR YOUR SERVICE

| | |
|---|---|
| SER. NO. OF CERTIFICATE OF USER WHO WANTS TO BECOME MEMBER OF YOUR SERVICE | User0001 |
| ID OF YOUR SERVICE OF WHICH USER WANTS TO BECOME MEMBER | Service A |

FIG. 20

INPUT MEMBERSHIP QUALIFICATION CONDITIONS OF YOUR SERVICE.

| SEX ▼ | 1. MALE  2. FEMALE  3. NOT CONCERNED |

| SEX ▼ | |
| AGE ANNUAL INCOME ▼ | |

| ▼ | |

⋮  ⋮

| ▼ | |

AFTER DESIGNATING CONDITIONS, PRESS THIS BUTTON.

101 — SIMULATION

IN THOSE CONDITIONS, [   ] % OF COMMON CERTIFICATES,

[   ] USERS CAN BECOME MEMBERS OF YOUR SERVICE.

F I G.  2 5

| SER. NO. OF CERTIFICATE |
|---|
| User 0001 |
| User 0005 |
| User 0068 |
| ⋮ |

FIG. 26

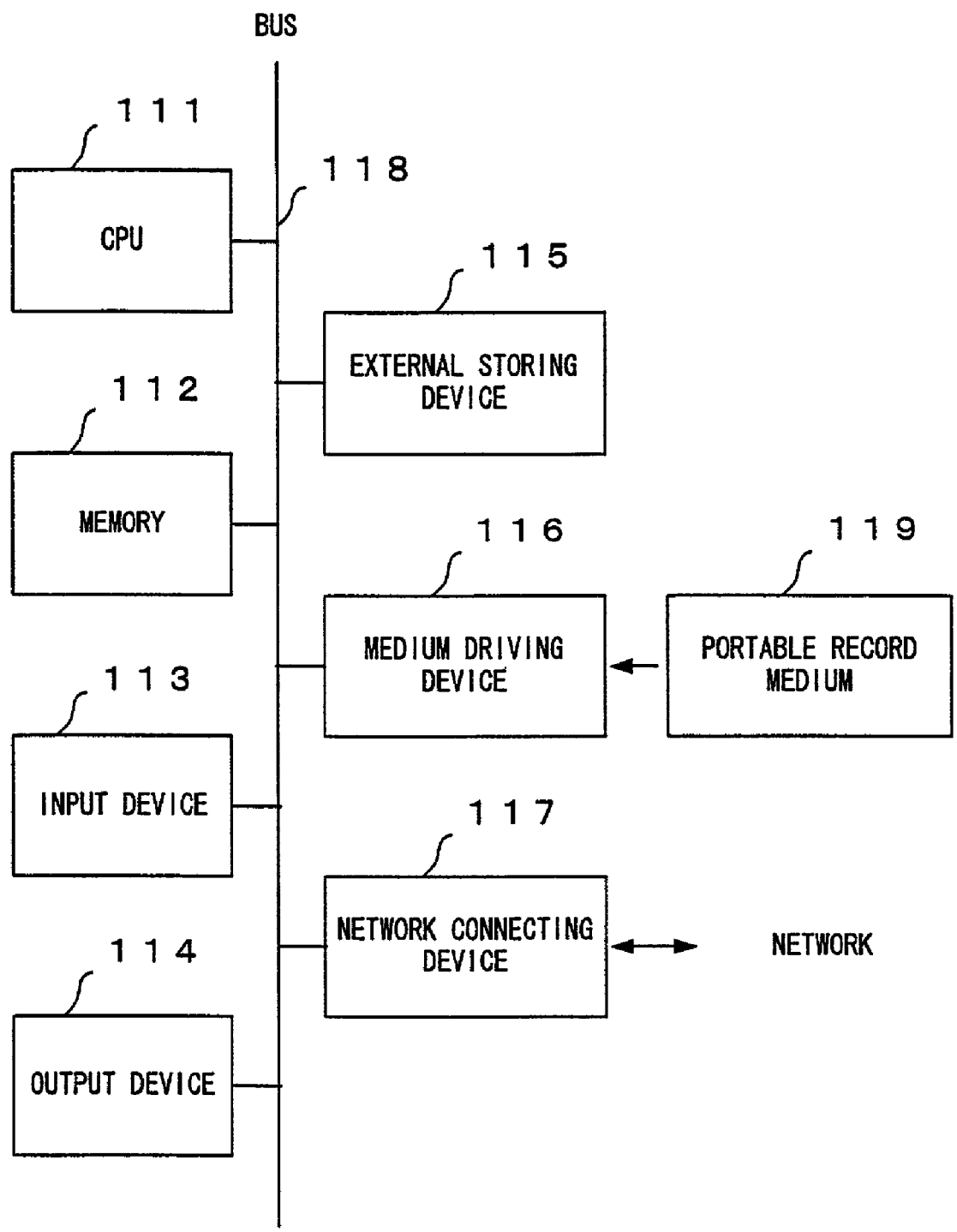
F I G. 2 7

MEMBERSHIP QUALIFICATION PROCESSING SYSTEM AND METHOD THEREOF

BACKGROUND OF THE INVENTION

1. Field of the Invention

The present invention relates to a membership service using a network such as the Internet. In particular, the present invention relates to a system and a method for processing a membership qualification for each of a plurality of services.

2. Description of the Related Art

A service provider on a network should certificate a user who is accessing the network so as to charge the user for a service fee. In a conventional service system, when one user uses a plurality of services, the uses different certificating methods designated by the individual services.

FIG. 1 shows such a conventional service system. When user 11 uses two services A and B, the user 11 sends identification (ID) and a password (PWD) for the service A to a server 12 of the service A. The server 12 references a user management database (user management DB) 13, certificates the user, and provides the service A to the user 11.

The user 11 sends an ID and a password for the service B to a server 14 of the service B. The server 14 references a user management DB 15, certificates the user, and provides the service B to the user 11. In such a manner, the user 11 can use the network services A and B.

However, the above-described conventional service system has the following problems.

When one user uses a plurality of network services, the user should take a membership qualification for each service. At that time, the user should input designated personal information on a terminal unit. Thus, when the number of services that the user uses increases, the load of the user increases.

Each service provider should perform a membership qualification for each user. Thus, each service provider should analyze personal information sent from each user. Consequently, as the number of users who want become members increases, the load of the service provider increases.

When each service provider starts a new service, while predicting the number of new members, the service provider should designate conditions used for the membership qualification. To do that, a system that allows the relation between the designated conditions and the number of members to be effectively analyzed is desired.

SUMMARY OF THE INVENTION

An object of the present invention is to provide a system and a method that allow a membership qualifying process for each of a plurality of membership services used by a user to be effectively performed.

A first aspect of the present invention is a processing system, comprising a storing device, a selecting device, and a presenting device. The storing device stores membership qualification conditions of a plurality of services. The selecting device compares membership qualification conditions of a service of which a user has become a member (referred to as joined service) with membership qualification conditions of a service of which the user has not become a member (referred to as non-joined service) and selects a service of which the user can become a member. The presenting device 23 presents information about the service of which the user can become a member to the user.

A second aspect of the present invention is a processing system, comprising a storing a storing device, a first determining device, and a second determining device. The storing device stores identification information of a first service as qualification criterion information for qualifying membership of a second service. The first determining device determines whether or not a user has used the second service when the user wants to become a member of the first service. The second determining device determines that the user has a membership qualification for the second service when the user has used the first service.

A third aspect of the present invention is a processing system, comprising a storing device, a designating device, a simulating device, and an output device. The storing device stores membership qualification conditions of an existing service. The designating device designates a new membership qualification condition. The simulating device compares the membership qualification conditions of the existing service with the new membership qualification condition and obtains information about the number of users who can become members of the service corresponding to the new membership qualification condition. The output device outputs the obtained information.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 5 is a schematic diagram showing a certificate management table;

FIG. 6 is a schematic diagram showing an available service management table;

FIG. 7 is a schematic diagram showing a user information management table;

FIG. 8 is a flow chart showing an issuing process and invalidating process for a certificate;

FIG. 12 is a schematic diagram showing a service table;

FIG. 13 is a schematic diagram showing a membership qualification table;

FIG. 17 is a schematic diagram showing a service selection screen;

FIG. 20 is a schematic diagram showing a condition input screen;

FIG. 25 is a schematic diagram showing a simulation screen;

FIG. 26 is a schematic diagram showing a member count table;

FIG. 27 is a block diagram showing the structure of an information processing unit.

DESCRIPTION OF PREFERRED EMBODIMENT

Next, with reference to the accompanying drawings, an embodiment of the present invention will be described.

Figure 1:
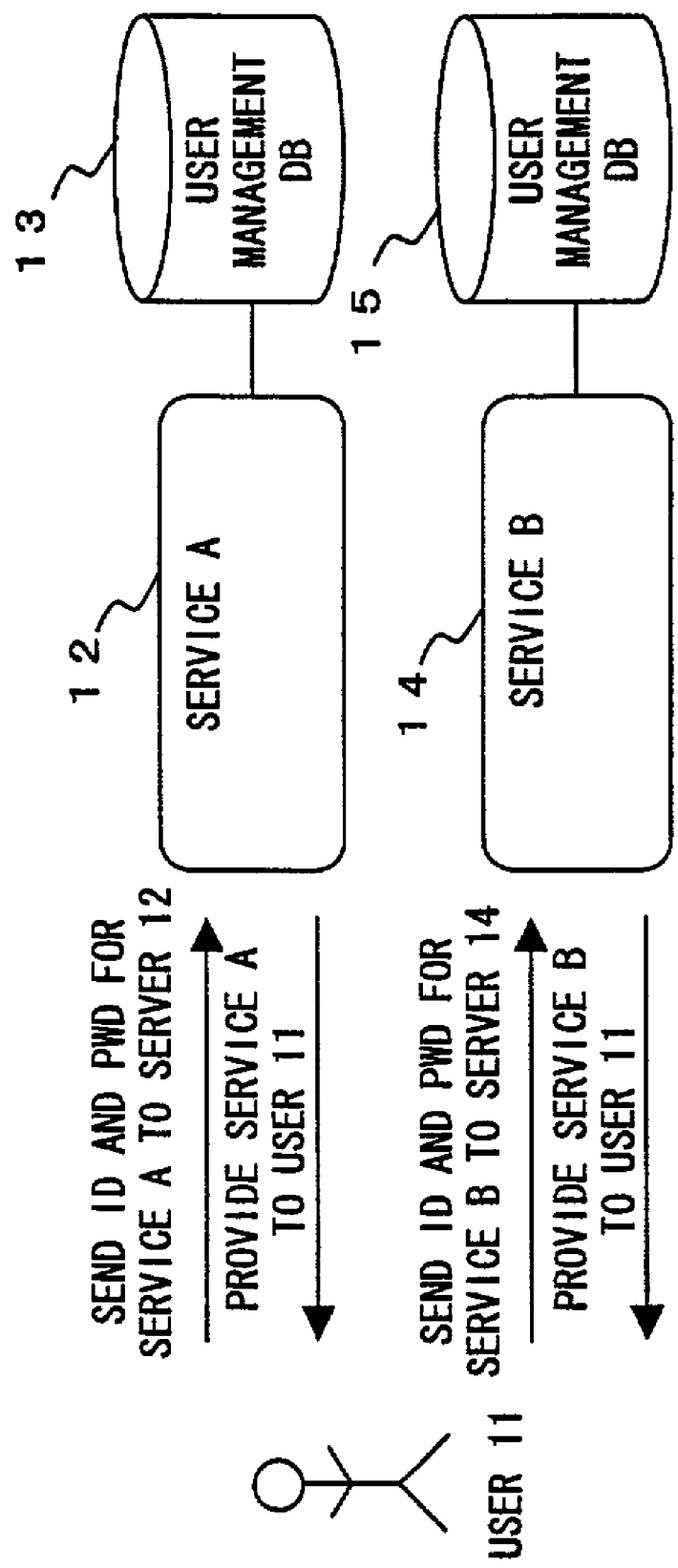
FIG. 1 is a schematic diagram showing the structure of a conventional service system.
Figure 2:
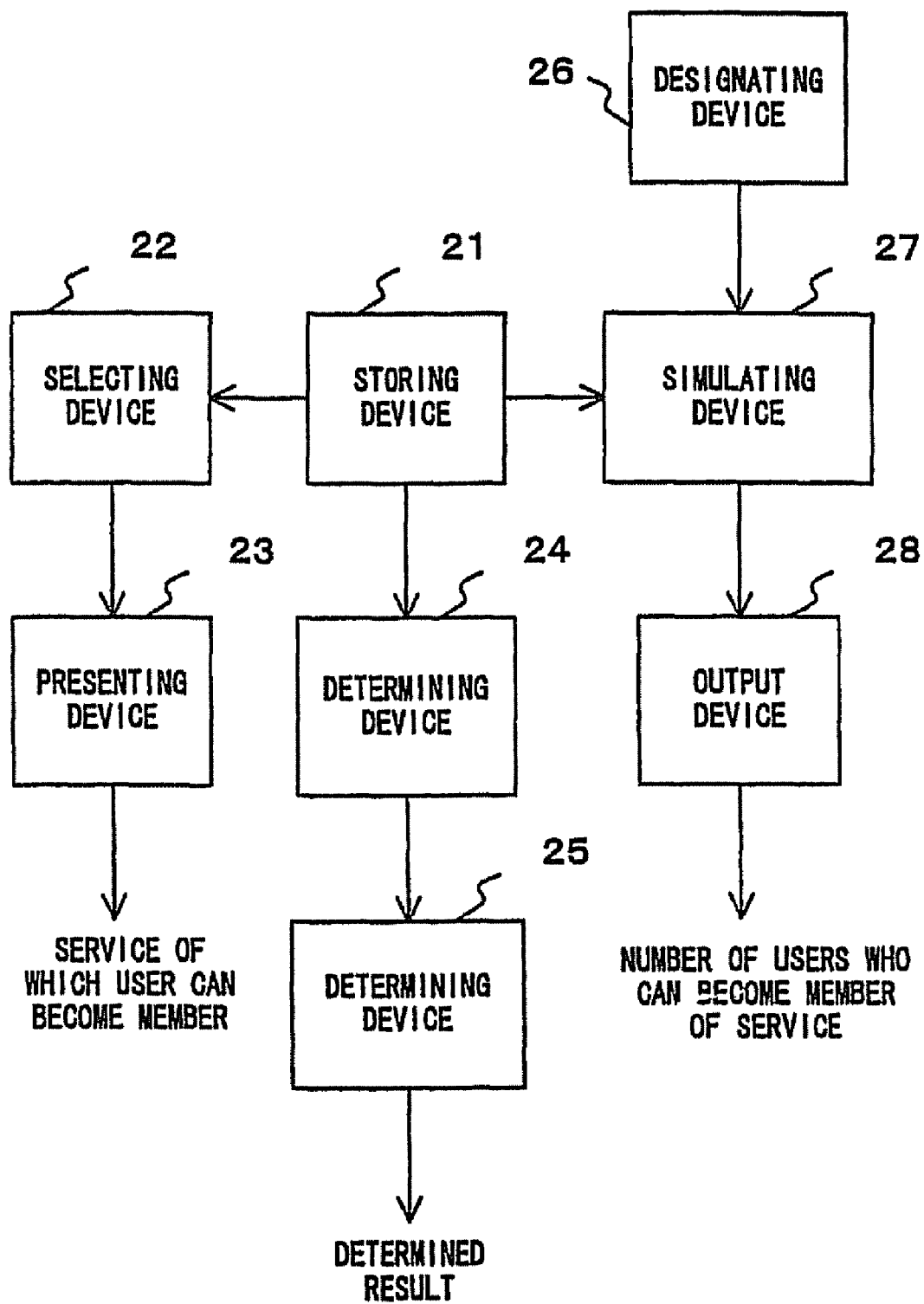
FIG. 2 is a block diagram showing the theory of a processing system according to the present invention.

FIG. 2 is a schematic diagram showing the theory of a processing system according to the present invention.

A first aspect of the present invention is a processing system, comprising a storing device 21, a selecting device 22, and a presenting device 23. The storing device 21 stores membership qualification conditions of a plurality of services. The selecting device 22 compares membership qualification conditions of a service of which a user has become a member (referred to as joined service) with membership qualification conditions of a service of which the user has not become a member (referred to as non-joined service) and selects a service of which the user can become a member. The presenting device 23 presents information about the service of which the user can become a member to the user.

When the user wants information about services of which the user can become members, the selecting device 22 extracts membership qualification conditions of joined services and membership qualification conditions of non-joined services from membership qualification conditions stored in the storing device 21. The selecting device 22 compares those membership qualification conditions, selects services of which the user can become members, and passes the selected result to the presenting device 23. The presenting device 23 presents a list of services of which the user can become members as the selected result to the user.

According to the processing system, before the user takes a membership qualification, the user can obtain a list of services of which the user can become members. Thus, without need to take membership qualifications for all non-joined services, the user can narrow services of which the user can become members and effectively select a service of which the user wants to become a member.

A second aspect of the present invention is a processing system, comprising a storing a storing device 21, a first determining device 24, and a second determining device 25. The storing device 21 stores identification information of a first service as qualification criterion information for qualifying membership of a second service. The first determining device 24 determines whether or not a user has used the second service when the user wants to become a member of the first service. The second determining device 25 determines that the user has a membership qualification for the second service when the user has used the first service.

When the user wants to become a member of a first service, the first determining device 24 references the qualification criterion information for qualifying the membership of the first service and obtains identification information of a second service, the identification information being contained in the qualification criterion information. The first determining device 24 determines whether or not the user has used a second service corresponding to the identification information and passes the determined result to the second determining device 25. When the determined result represents that user has used the second service, the second determining device 25 determines that the user has a membership qualification for the first service.

According to the processing system, when the user becomes a member of a new service, the membership qualification can be determined corresponding to membership qualification conditions of a service of which the user has become a member instead of users personal information. Thus, the membership qualification can be simplified. Thus, the load of a service provider alleviates.

A third aspect of the present invention is a processing system, comprising a storing device 21, a designating device 26, a simulating device 27, and an output device 28. The storing device 21 stores membership qualification conditions of an existing service. The designating device 26 designates a new membership qualification condition. The simulating device 27 compares the membership qualification conditions of the existing service with the new membership qualification condition and obtains information about the number of users who can become members of the service corresponding to the new membership qualification condition. The output device 28 outputs the obtained information.

When a service provider wants to analyze the relation between membership qualification conditions of the service and the number of users, the service provider designates a new membership qualification condition using the designating device 26. The simulating device 27 compares the existing membership qualification conditions of the service stored in the storing device 21 with the designated membership qualification condition and obtains the number of users who can become members of the service corresponding to the designated membership qualification condition. The output device 28 outputs the relation between the designated membership qualification condition and the obtained number of users.

According to the processing system, when the service provider starts a new service or changes the membership qualification conditions of the existing service, while considering the number of users who can become members of the service, the service provider can effectively designate a membership qualification condition for qualifying the membership. Thus, the load of the service provider alleviates.

For example, the storing device 21 shown in FIG. 2 corresponds to a service management DB 52 shown in FIG. 10 (the service management DB 52 will be described later). The selecting device 22, the presenting device 23, the determining device 24, the determining device 25, the designating device 26, the simulating device 27, and the output device 28 shown in FIG. 2 correspond to a certificate managing portion 51 shown in FIG. 10.

A service system according to the embodiment includes a certificating system using a digital certificate. When the user presents one digital certificate to a plurality of independent network services, the certificating system permits the user to use those services. The certificating system issues a digital certificate to only a user certificated by a predetermined certificating method. The digital certificate represents that the user can use a plurality of services.

The digital certificate is generated by a certificate authority that digitally signing data of which a user name, a certificate issuer, a serial number, a user's public key, and so forth are integrated corresponding to Specification X. 509 of ITU-U (International Telecommunication Union Telecommunication Standardization Sector). The certificate authorizes that the public key contained therein belongs to the user.

Figure 3A:
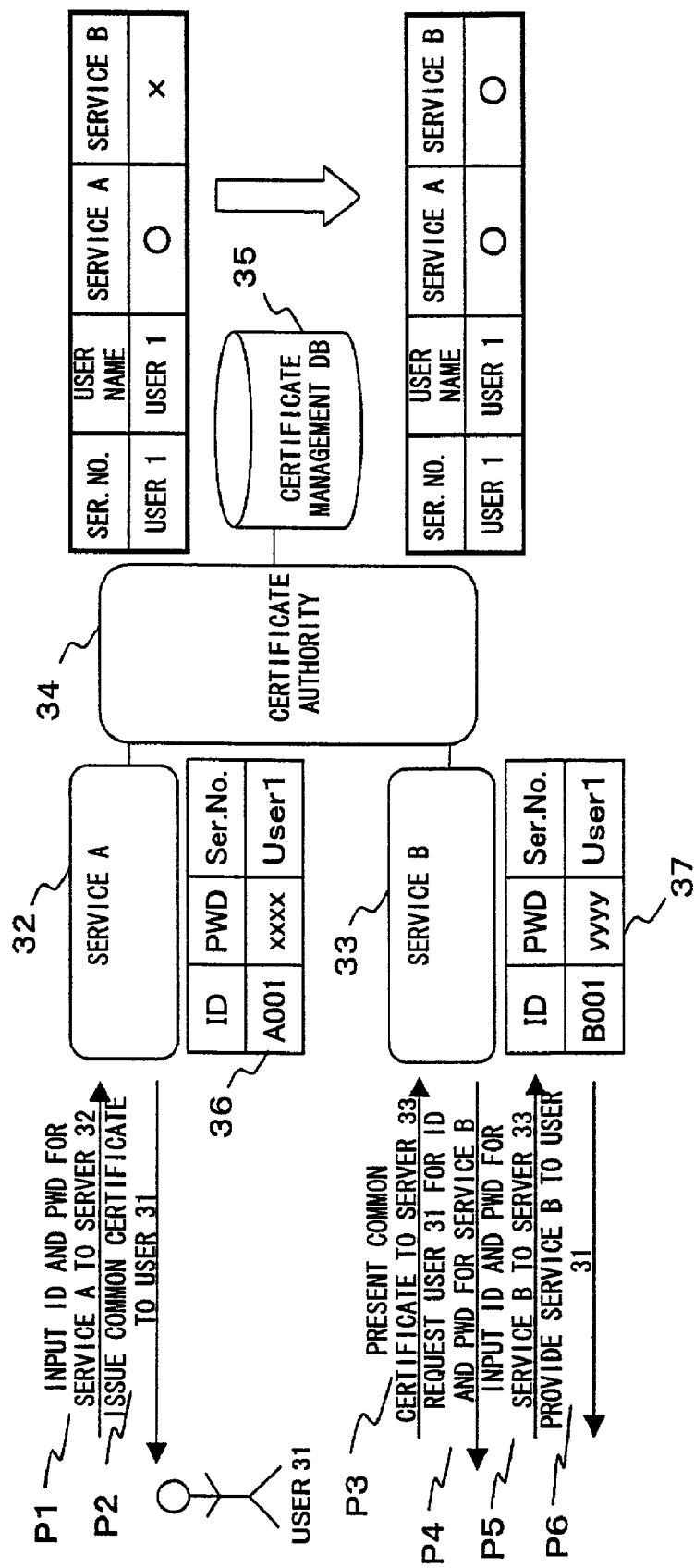
FIG. 3A is a schematic diagram showing an issuing process and a qualifying process for a certificate.

FIG. 3A shows an issuing process and a qualifying process for a digital certificate performed by such a certificating system. In FIG. 3A, services A and B are membership services using IDs and passwords. Services 32 and 33 provide the services A and B to a user 31, respectively. A certificate authority 34 is a certificate issuing organization that is independent from the service providers. The certificate authority 34 issues a digital certificate that is common with the services A and B to the user 31. The digital certificate is referred to as common certificate.

To allow the user 31 to be certificated with the common certificate, the certificate authority 34 should issue a common certificate to the user 31. In that case, the certificate authority 34 issues a common certificate to the user 31 through the service A. When the user 31 initially accesses the service B, the server 33 qualifies the common certificate. The servers 32 and 33 contain user information management tables 36 and 37, respectively. Each of the information management tables 36 and 37 contain an ID, a password, and so forth of the user 31. In that case, the following process is performed in this sequence.

P1: The user 31 sends the ID and the password for the service A to the server 32. The server 32 references the user information management table 36 and certificates the user 31. When the certificated result is OK, the server 32 requests the certificate authority 34 to issues the common certificate.

P2: The server 32 receives the common certificate from the certificate authority 34 and issues the common certificate to the user 31. At that point, the common certificate that the user 31 has certificates the use of only the service A. A certificate management DB 35 of the certificate authority 34 contains the relevant user name and information that represents the validity of the use of the service A along with identification information (for example, a serial number) of the common certificate. The user information management table 36 contains a serial number (Ser. No.) of the common certificate along with the ID and the password.

P3: The user 31 presents the issued common certificate to the server 33.

P4: The server 33 determines that the present common certificate does not certificate the use of the service B and request the user 31 for the ID and the password for the service B.

P5: The user 31 sends the ID and the password for the service B to the server 33.

P6: The server 33 references the user information management table 37 and certificates the user. When the certificated result is OK, the server 33 provides the service B to the user 31. Thereafter, the common certificate that the user 31 has allows the user 31 to use the service B. At that point, the common certificate that the user 31 has certificates the use of the services A and B. The certificate management DB 35 contains information that represents the validity of the use of the services A and B. In addition, the user information management table 37 contains the serial number of the common certificate along with the ID and the password.

Figure 3B:
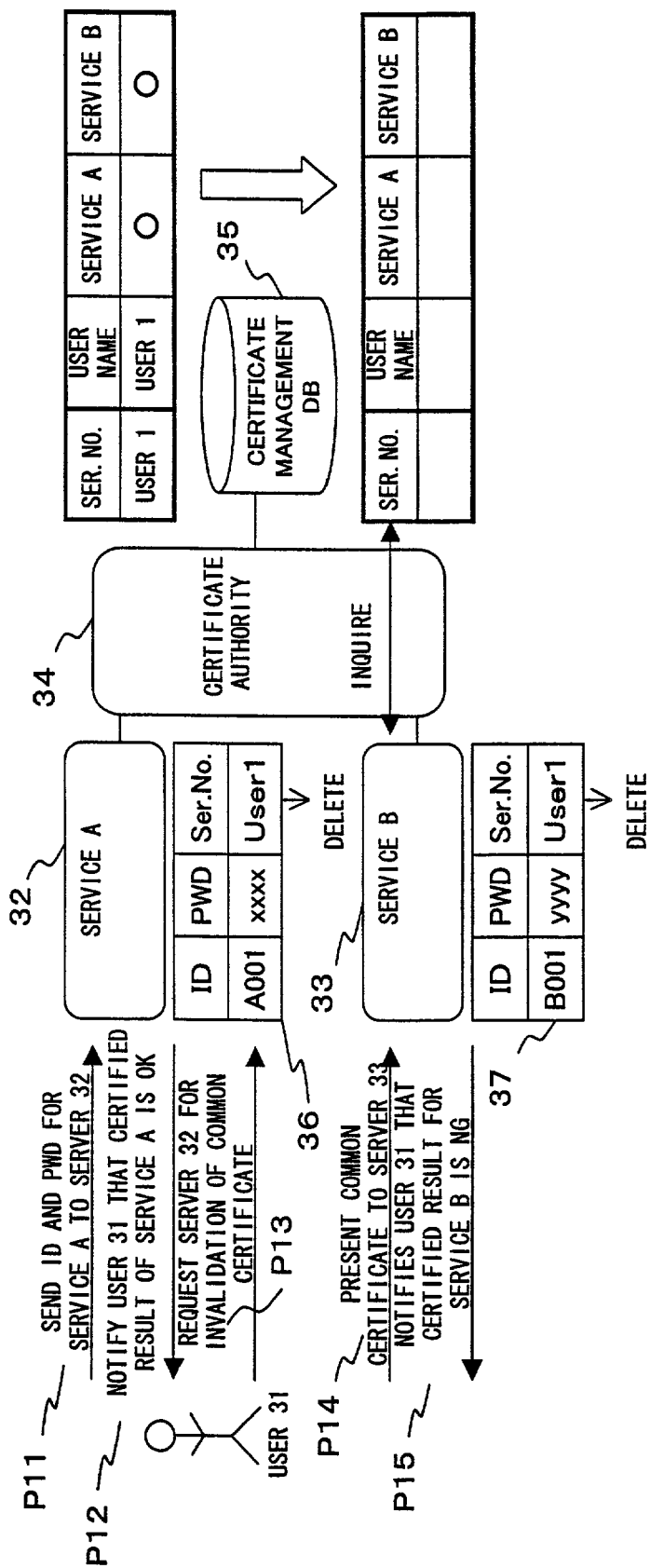
FIG. 3B is a schematic diagram showing an invalidating process for a certificate.

At steps P1 and P5, the user is certificated with IDs and passwords. Alternatively, the user may be certificated with another certificating method using finger print information, voice print information, picture information, or the like. When the user wants to quit the use of a service, the user performs an invalidating process for the common certificate or a service use prohibiting process. When the user performs the invalidating process for the common certificate, the following process is performed in this sequence as shown in FIG. 3B.

P11: The user 31 sends the ID and the password for the service A or the common certificate to the server 32.

P12: When the server 32 receives the ID and the password, the server 32 references the user information management table 36 and certificates the user 31. When the certificated result is OK, the server 32 notifies the user 31 that the certificated result is OK. When the server 32 receives the common certificate, the server 32 certificates the user 31 in a predetermined certificating method (that will be described later) and notifies the user 31 of the certificated result.

P13: The user 31 requests the server 32 for the invalidation of the common certificate that the user 31 has. The server 32 notifies the certificate authority 34 of the serial number of the common certificate and requests the certificate authority 34 to perform the invalidating process for the common certificate. The certificate authority 34 deletes the information of the common certificate from the certificate management DB 35. The server 32 deletes the serial number of the common certificate from the user information management table 36.

P14: Thereafter, the user 31 presents the common certificate that the user 31 has as certification information to the server 33. The server 33 notifies the certificate authority 34 of the serial number of the presented common certificate and inquires the certificate authority 34 for the validity of the common certificate.

P15: Since the notified serial number has not been registered to the certificate management DB 35, the certificate authority 34 notifies the server 33 that the checked result is NG. The server 33 deletes the serial number of the common certificate from the user information management table 37 and notifies the user 31 of the invalidity of the use of the service B.

Figure 4:
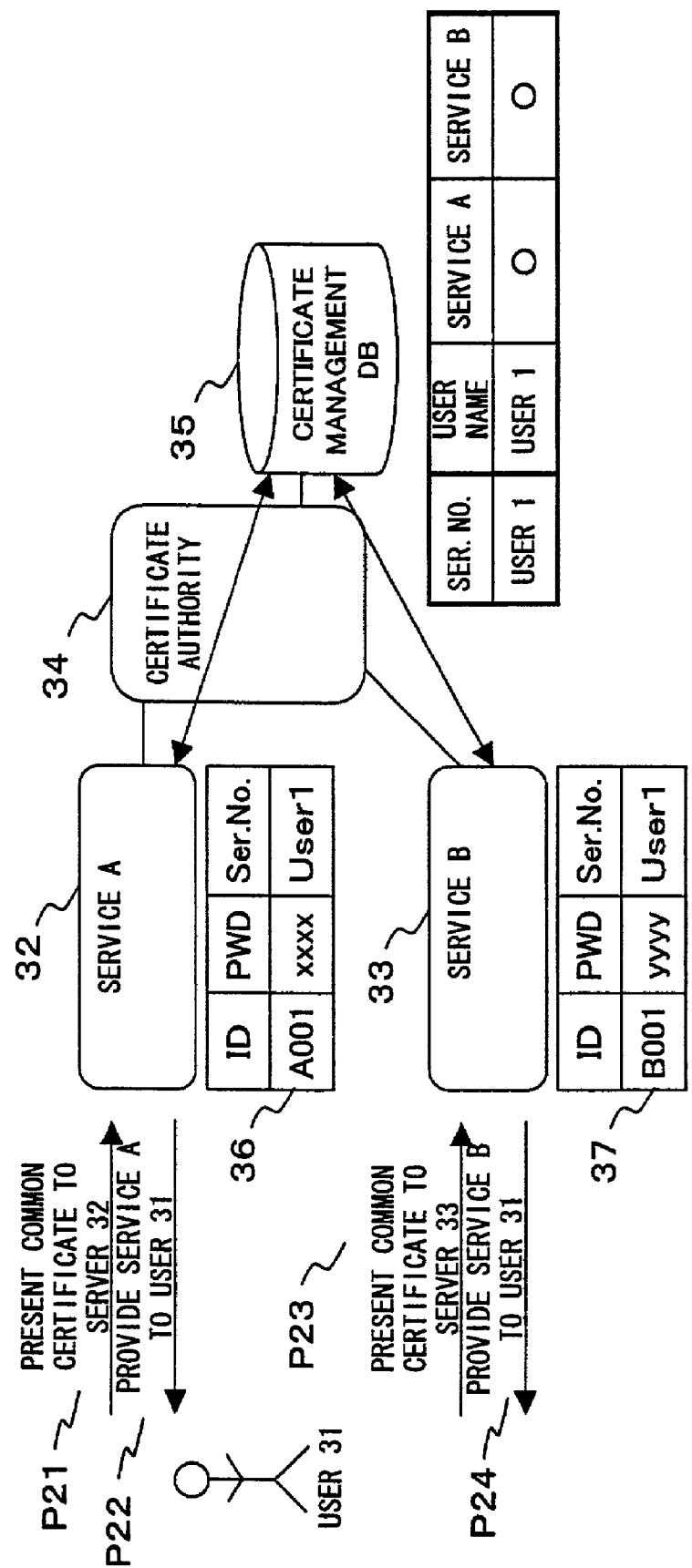
FIG. 4 is a schematic diagram showing a certificating process using a certificate.

FIG. 4 shows a user certificating process using an issued common certificate. In the case, a service is provided in the following sequence.

P21: The user 31 presents a common certificate that the user 31 has as certification information to the server 32. The server 32 notifies the certificate authority 34 of the serial number of the presented common certificate and requests the certificate authority 34 to check for the common certificate. The certificate authority 34 references the certificate management DB 35 and checks whether or not the notified serial number has been registered thereto. When the notified serial number has been registered and the service A can be used, the certificate authority 34 returns OK as the checked result to the server 32.

P22: When the server 32 receives OK from the certificate authority 34, the server 32 provides the service A to the user 31.

P23: The user 31 presents the common certificate that the user 31 has as certification information to the server 33. The server 33 receives the checked result from the certificate authority 34 in the same manner as the server 32.

P24: When the server 33 receives OK from the certificate authority 34, the server 33 provides the service B to the user 31.

In that example, the case that the user uses two services was described. This applies to the case that the user uses three or more services. The servers 32 and 33 request the certificate authority 34 for checking for the common certificate so as to determine whether the presented common certificate is invalid. However, it should be noted that the checking step can be omitted.

In that case, in the invalidating step, the certificate authority 34 notifies all servers of relevant services of the serial number of the invalidated common certificate. Each server deletes the serial number from the user information management table. When the user presents the common certificate to a particular server, if the serial number has been registered to a relevant user information management table, the certificated result is OK. If the serial number has not been registered, the certificated result is NG.

In the certificating system shown in FIGS. 3A, 3B, and 4, the user can use a plurality of service by presenting only a common certificate without need to use designated IDs and passwords for the individual services. Thus, the user does not need to memorize a plurality of IDs and passwords. In addition, whenever the user uses a service, the user does not need to input relevant ID and password. Thus, the user's load significantly alleviates.

The certificate management DB 35 contains a certificate management table shown in FIG. 5 and an available service management table shown in FIG. 6. The certificate management table shown in FIG. 5 contains a serial number, a user name, an address, and an e-mail address of a common certificate. The available service management table shown in FIG. 6 contains a serial number and an available service ID of a common certificate. The certificate management table and the available service management table are generated for each common certificate.

FIG. 7 shows an example of the user information management tables 36 and 37. The user information management table shown in FIG. 7 contains a user ID, a password, a user's name, a use s address, and a serial number of a common certificate. The user information management table is generated for each user.

FIG. 8 is a flow chart showing a process performed in the case that the user 31 requests the server 32 of the service A to issue or invalidate a common certificate. First of all, the user 31 accesses the server 32 (at step S1). The server 32 displays a login screen on the user's terminal unit (at step S2). Thereafter, the user 31 inputs an ID and a password for the service A (at step S3). The server 32 references the user information management table 36 and checks for the input ID and password (at step S4).

When the determined result at step S4 is No (namely the input ID and password are not valid), the server 32 repeats the process from step S2. When the determined result at step S4 is Yes (namely, the input ID and password are valid), the server 32 references the user information management table 36 and checks whether or not a common certificate has been issued to the user 31 (at step S5).

When the determined result at step S5 is No (the serial number of the use s common certificate has not been registered to the user information management table 36), the server 32 determines that the common certificate has not been issued to the user 31 and requests the certificate authority 34 to issue the common certificate (at step S6).

Thus, the certificate authority 34 issues the common certificate (at step S7). At that point, the certificate authority 34 generates a certificate management table that contains the serial number of the common certificate and the user information. In addition, the certificate authority 34 generates an available service management table that contains the serial number of the common certificate and the ID of the service A. The certificate authority 34 places those tables to the certificate management DB 35.

Thereafter, the server 32 delivers the issued common certificate to the user 31. The server 32 records the serial number of the common certificate to the user information management table 36 (at step S8). Thereafter, the server 32 completes the process.

When the determined result at step S5 is Yes (namely, the user information management table 36 contains the serial number of the common certificate), the server 32 notifies the user 31 that the common certificate has been issued and inquires the user 31 whether or not the user 31 want to invalidate the common certificate (at step S9). When the determined result at step S9 is No (namely, the user 31 does not want to invalidate the common certificate), the server 32 completes the process.

When the determined result at step S9 is Yes (namely, the user wants to invalidate the common certificate), the server 32 notifies the certificate authority 34 of the serial number of the common certificate and requests the certificate authority 34 to invalidate it (at step S10). Thus, the certificate authority 34 deletes the certificate management table and the available service management table corresponding to the notified serial number and notifies the server 32 of the processed result. The server 32 deletes the serial number of the common certificate from the user information management table 36 and notifies the user 31 that the common certificate has been invalided. Thereafter, the server 32 completes the process.

Figure 9:
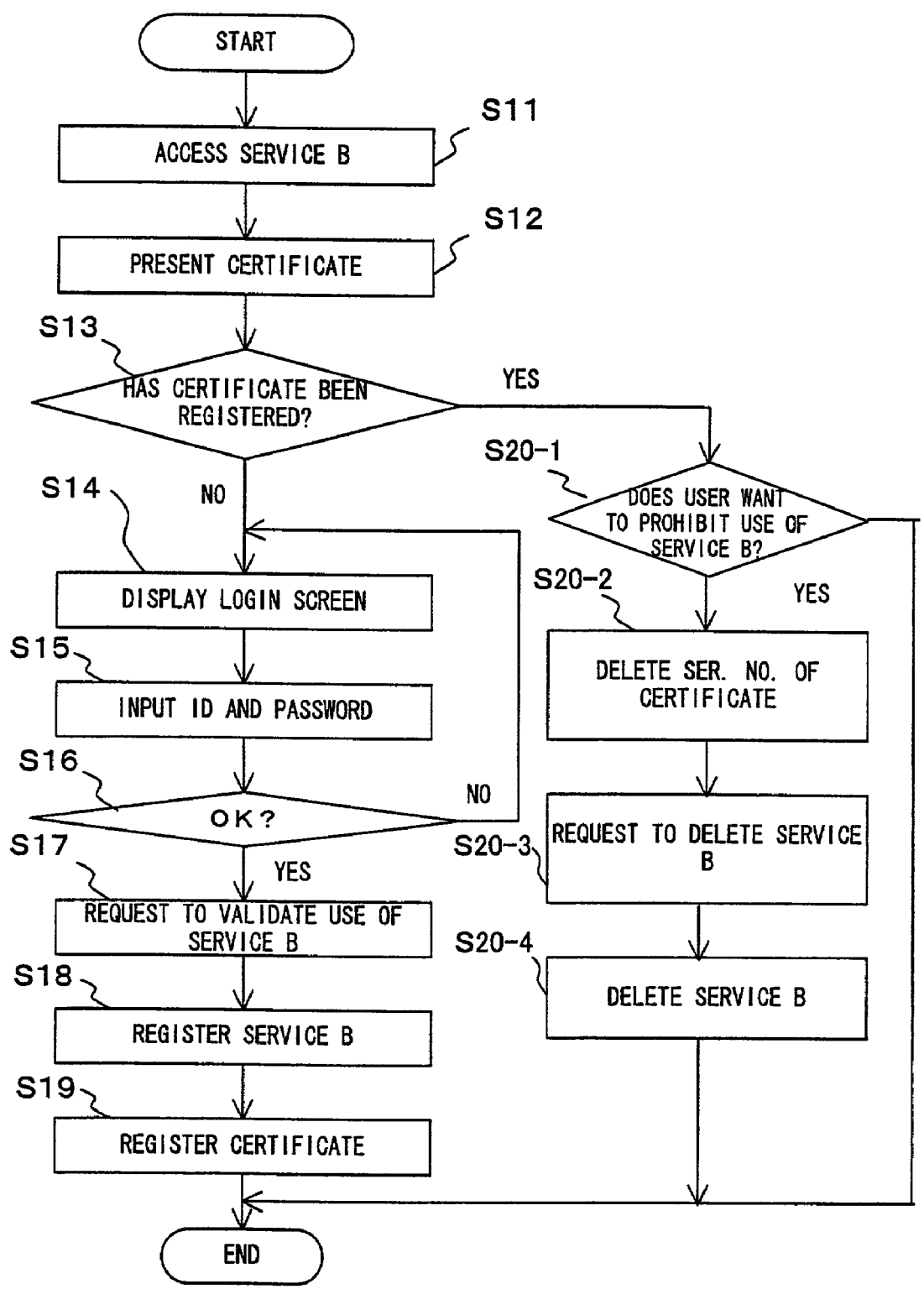
FIG. 9 is a flow chart showing a qualifying process for a certificate.

FIG. 9 is a flow chart showing a process in the case that the user 31 requests the server 33 to qualify a common certificate that the user 31 has. First of all, the user 31 accesses the server 33 (at step S11) and presents the common certificate thereto (at step S12).

Thereafter, the server 33 checks whether the user information management table 37 contains the serial number of the presented common certificate (at step S13). When the determined result at step S13 is No (namely, the user information management table 37 does not contain the serial number), the server 33 performs the process at steps S14 to S16 that are the same steps as steps S2 to S4, respectively.

When the determined result at step S16 is Yes (namely, the ID and the password are valid), the server 33 notifies the certificate authority 34 of the serial number of the presented common certificate and requests the certificate authority 34 to validate the use of the service B with the common certificate (at step S17).

Thus, the certificate authority 34 adds the ID of the service B to an available service management table corresponding to the notified serial number and notifies the server 33 of the validity of the use of the service B (at step S18). Thereafter, the server 33 records the serial number of the common certificate to the user information management table 37 (at step S19). Thereafter, the process is completed.

When the determined result at step S13 is Yes (namely, the user information management table 37 contains the serial number of the common certificate), the server 33 inquires the user 31 whether or not the user 31 wants to prohibit the use of the service B (at step S20-1). When the determined result at step S20-1 is No (namely, the user does not want to prohibit the use of the service B), the server 33 completes the process.

When the determined result at step S20-1 is Yes (namely, the user wants to prohibit the use of the service B), the server 33 deletes the serial number of the presented common certificate from the user information management table 37 (at step S20-2) and requests the certificate authority 34 to delete the service B from the available service of the common certificate (at step S20-3).

Thus, the certificate authority 34 deletes the service ID of the service B from the relevant available service management table and notifies the server 33 that the service B has been deleted (at step S20-4). Thereafter, the server 33 notifies the user 31 that the use of the service B has been prohibited. Thereafter, the server 33 completes the process.

In the above-described example, the certificate management table and the available service management table are independently provided. Alternatively, information of those tables may be contained in one table.

Figure 10:
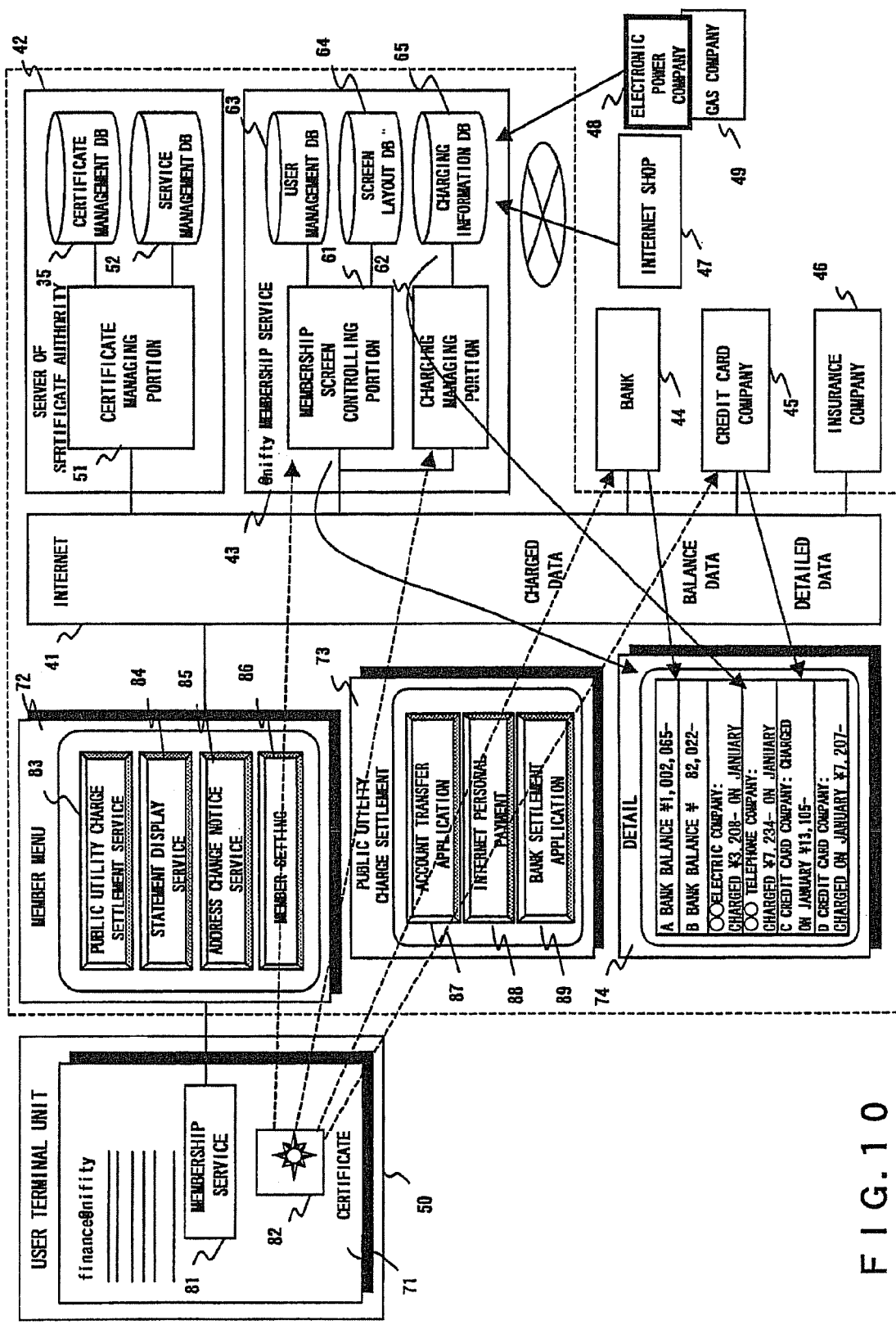
FIG. 10 is a block diagram showing the structure of a service system.
Figure 11:
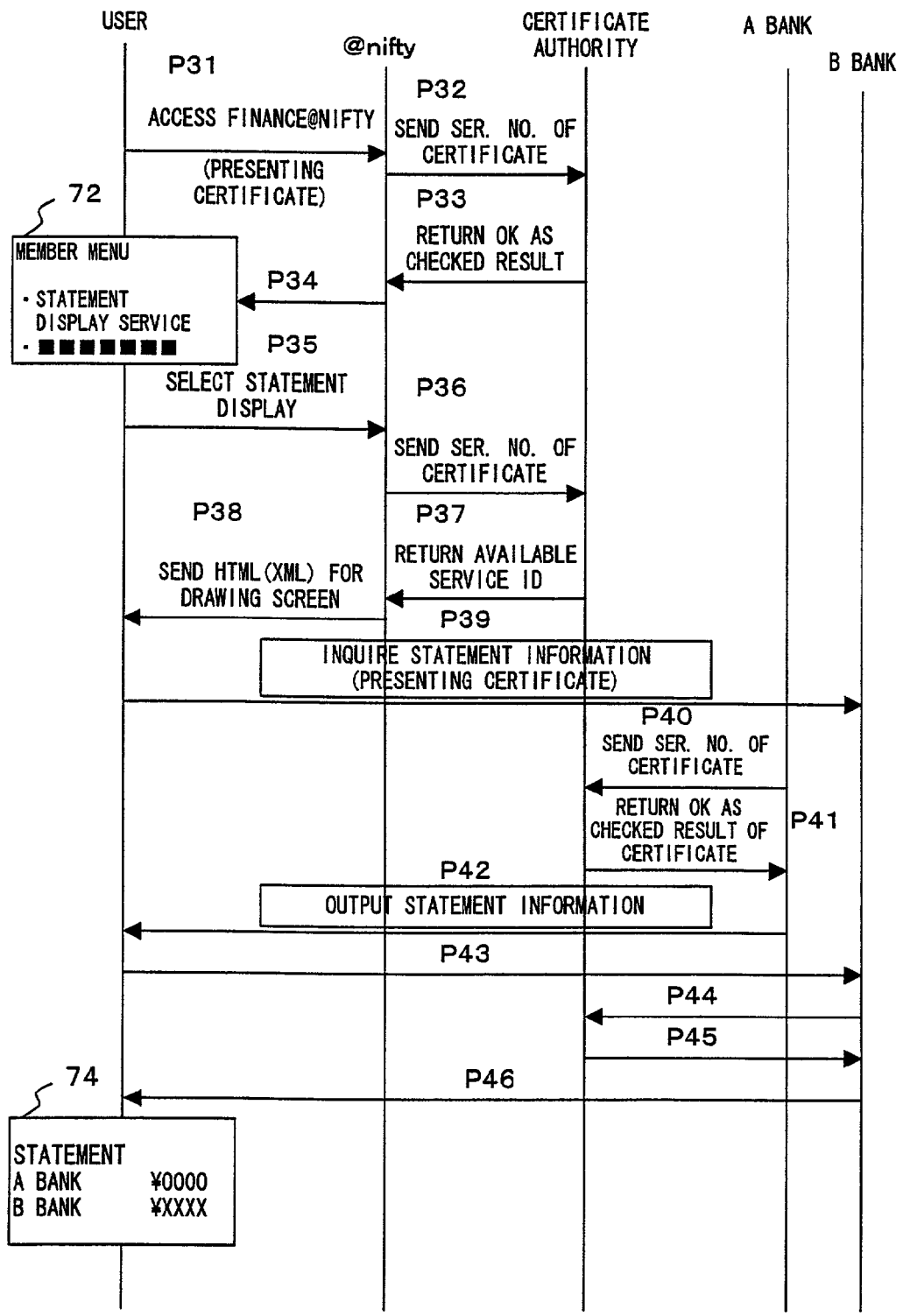
FIG. 11 is a schematic diagram showing an example of the use of a plurality of services.

Next, with reference to FIGS. 10 and 11, an example of which the above-described certificating system is applied to Nifty, which is an Internet membership service.

Many companies provide services as portal sites on Nifty. A portal site, which is a huge web site that is a gate of the Internet, has links to various service sites. However, when a plurality of independent services are concentrated to a portal site, the certificating process becomes complicated. Besides Nifty, such a problem takes place at any portal site. In that situation, using the above-described common certificate, the certificating process can be simply performed for a plurality of services.

FIG. 10 is a block diagram showing the structure of a service system including a portal site Finance@nifty, which provides financial services. The service system shown in FIG. 10 comprises the Internet 41, a server 42 of a certificate authority, a server 43 of a @nifty membership service, a server 44 of a bank, a server 45 of a credit card company, a server 46 of an insurance company, a server 47 of an Internet shop, a server 48 of an electric power company, a server 49 of a gas company, and a user terminal unit 50.

In the example, the @nifty, the bank, the credit card company, the insurance company, the Internet shop, the electric power company, and the gas company are independent business organizations that provide respective membership services.

The server 42 of the certificate authority comprises a certificate management DB 35, a certificate managing portion 51, and a service management database 52. The certificate management DB 35 contains a certificate management table and an available service management table for each common certificate. The certificate managing portion 51 for example issues, checks, and invalidates a common certificate using the certificate management DB 35. The service management DB 52 contains information about each service. The certificate managing portion 51 performs a membership qualifying process for each service.

The server 43 of the @nifty membership service comprises a membership screen controlling portion 61, a charging managing portion 62, a user management DB 63, a screen layout DB 64, and a charging information DB 65. The user management DB 63 contains a user information management table of each user. The screen layout DB 64 contains data of a membership service screen. The charging information DB 65 contains data of charged amount collected from the servers 47, 48, and 49 and so forth.

The membership screen controlling portion 61 controls a screen display of the user terminal unit 50 using the user management DB 63 and the screen layout DB 64. The charging managing portion 62 controls a screen display of the charged amount using the charging information DB 65.

For example, a page 71 of the Finance@nifty displayed on the user terminal unit 50 contains items of a membership service 81 and a certificate 82. When the user designates those items, the user terminal unit 50 automatically sends its common certificate to the server 43. The server 43 certificates the user with the common certificate. When the user has been successfully certificated, the user terminal unit 50 displays a page 72 of a member menu. The page 72 contains items of a public utility charge settlement service 83, a statement display service 84, an address change notice service 85, and a member setting 86.

When the user selects the public utility charge settlement service 83, the user terminal unit 50 sends the common certificate to the server 44. The server 44 certificates the user with the common certificate. When the user has been successfully certificated, the user terminal unit 50 displays a page 73 of public utility charge settlement. The page 73 contains items of account transfer application 87, Internet personal payment 88, and bank settlement application 89.

When the user selects the statement display service 84, the user terminal unit 50 displays a page 74 of user's detailed financial information. At that point, when necessary, the user terminal unit 50 sends the common certificate to the servers 44 and 45. The servers 44 and 45 certificate the user.

The layout data of the page 74 is supplied from the membership screen controlling portion 61. The data of the charged amount is supplied from the charging managing portion 62. The balance data of the bank account is supplied from the server 44 of the bank. The charge settlement data of the credit card is supplied from the server 45 of the credit card company.

FIG. 11 shows a process of which a user uses the statement display service 84 in the service system shown in FIG. 10. In the process, a plurality of services of business organizations such as @nifty, a bank, and a credit card company are provided in the following sequence.

P31: The user accesses the Finance@nifty site with the common certificate on the user terminal unit 50.

P32: The server 43 of the @nifty membership service notifies the server 42 of the certificate authority of the serial number of the common certificate.

P33: The server 42 references a relevant available service management table of the certificate management DB 35. When the common certificate represents the validity of the @nifty membership service, the server 42 returns OK as the checked result to the user terminal unit 50.

P34: The server 43 causes the user terminal unit 50 to display the member menu 72.

P35: The user selects the statement display service from the member menu 72.

P36: The server 43 notifies the server 42 of the certificate authority of the serial number of the common certificate and inquires the server 42 of the certificate authority for available services corresponding to the notified serial number.

P37: The server 42 references a relevant available service management table, obtains an available service ID corresponding to the notified serial number, and returns it to the server 43.

P38: The server 43 sends layout data for drawing a screen including a display region corresponding to the received service ID to the user terminal unit 50. The layout data is described in HTML (HyperText Markup Language), XML (extensible Markup Language) or the like.

P39: The user terminal unit 50 inquires the server of the A bank for statement information with the common certificate.

P40: The server of the A bank notifies the server 42 of the certificate authority of the serial number of the presented common certificate.

P41: The server 42 references a relevant available service management table of the certificate management DB 35. When the common certificate represents the validity of the service of the A bank, the server 42 of the certificate authority returns OK as the checked result to the user terminal unit 50.

P42: The server of the A bank sends balance data of the user's account as the statement information to the user terminal unit 50.

P43 to P46: The server of the B bank sends balance data of the user's account to the user terminal unit 50 corresponding to the certificated result of the common certificate in the same manner as the server of the A bank.

As a result, the user terminal unit 50 displays the statement page 74. In the same manner, the server 45 of the credit card company and the server 46 of the insurance company can provide the statement information of the statement page 74.

According to the service system shown in FIG. 10, statement information such as account balances and charged amounts of individual services can be integrally displayed on one layout screen. Thus, the user can transversely use a plurality of services. In FIG. 10, the function of the certificate authority is independent from each service. Alternatively, the function of the certificate authority may be contained in the @nifty membership service.

Next, with reference to FIGS. 12 to 26, a membership qualifying process performed by the server 42 of the certificate authority shown in FIG. 10 will be described.

The service management DB 52 of the server 42 contains membership qualification criterion information of a plurality of services. The certificate managing portion 51 references the membership qualification criterion information and performs an available membership service displaying process, a membership qualifying process, a membership qualification condition simulating process, and so forth.

In the available membership service displaying process, corresponding to the membership qualification criterion information of each service, a service that can be used by a particular user is selected from a plurality of services and the selected service is displayed. In the membership qualifying process, information of a service of which a user has already become a member is used on behalf of the server of each service. In the membership qualification condition simulating process, a new membership qualification criterion is simulated corresponding to membership qualification criterion information of each service.

FIG. 12 shows an example of a service table contained in the service management DB 52. FIG. 13 shows an example of a membership qualification table contained in the service management DB 52. Those tables are generated for each service.

The service table shown in FIG. 12 contains a service ID, a company ID, user membership qualification conditions 1 to t of the service, a service category, a service name, a service summary, a membership application URL (Uniform Resource Locator), and a membership inquiry e-mail address. The membership qualification conditions 1 to t correspond to the membership qualification criterion information. Referring to FIG. 12, the service has membership qualification conditions of sex, age, annual income, company of employment, and so forth. In this example, an applicant who is a female of up to 40 years old and who has an annual income of over ¥ 6,000,000 can become a member of the service.

The membership qualification table shown in FIG. 13 contains a service ID and qualification criteria. The qualification criteria include a company ID and a service ID of a service provided by the company. The membership qualification table is used to qualify the membership of a user to a service corresponding to membership qualification conditions of another service.

According to the qualification criteria shown in FIG. 13, a user who uses services "★★★★B" and "★★★★C" of a company "aaaaa", any service of a company "bbbbb", or a service "★★★★D" of a company "cccc" is permitted to become a member of the service A.

When a company can be identified with the content (sequence of digits) of a service ID, the membership qualification table does not always need to contain the company ID. When a user does not satisfy the qualification criteria of the membership qualification table, the user is qualified corresponding to the membership qualification conditions of the service table in the conventional membership qualifying process.

Figure 14:
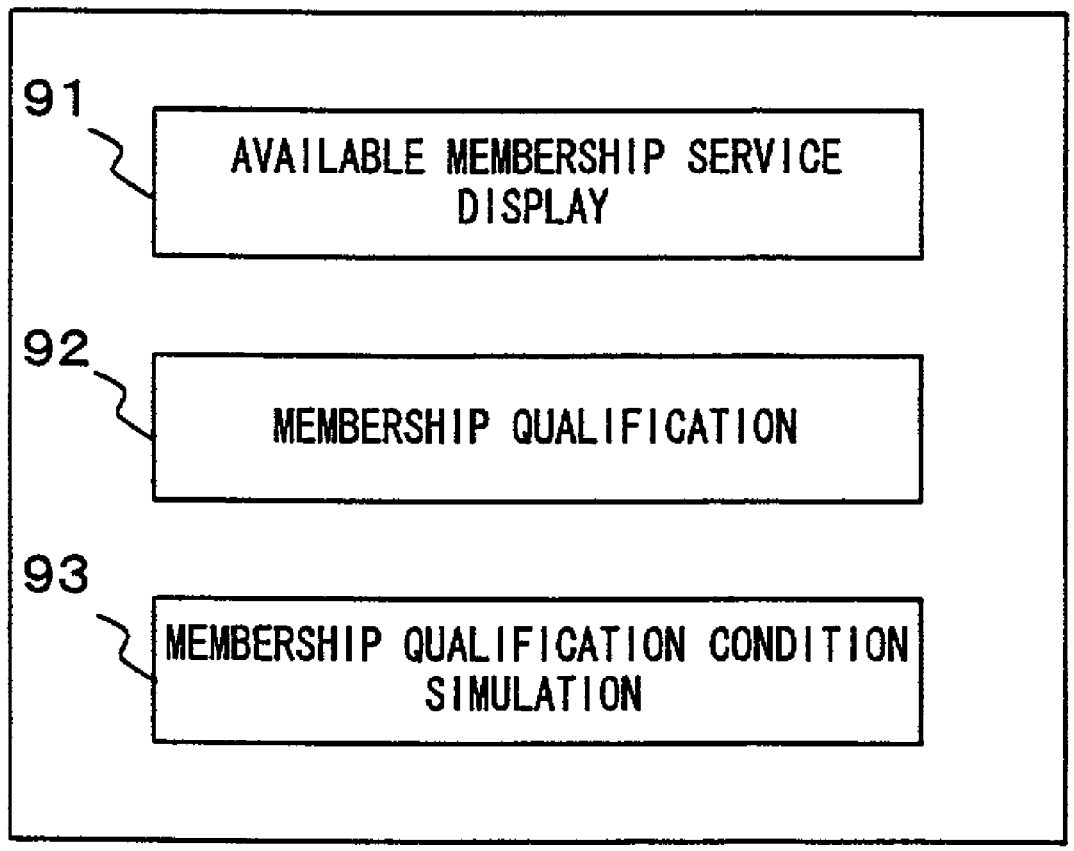
FIG. 14 is a schematic diagram showing a menu of a certificate authority.

FIG. 14 shows an example of the menu screen displayed when a user or a service provider accesses the server 42 of the certificate authority. The menu shown in FIG. 14 contains items of an available membership service display 91, a membership qualification 92, and a membership qualification condition simulation 93. When the user selects the available membership service display 91 with a common certificate, the server 42 of the authenticating office performs the service displaying process. When the service provider selects the membership qualification 92, the server 42 of the authenticating office performs the membership qualifying process. When the service provider selects the membership qualification condition simulation 93, the server 42 of the authenticating office performs the membership qualification condition simulating process.

The menu screen may separately display a screen for a member and a screen for a service provider. In this case, those screens display only items that can be used by the user and the service provider, respectively.

Figure 15:
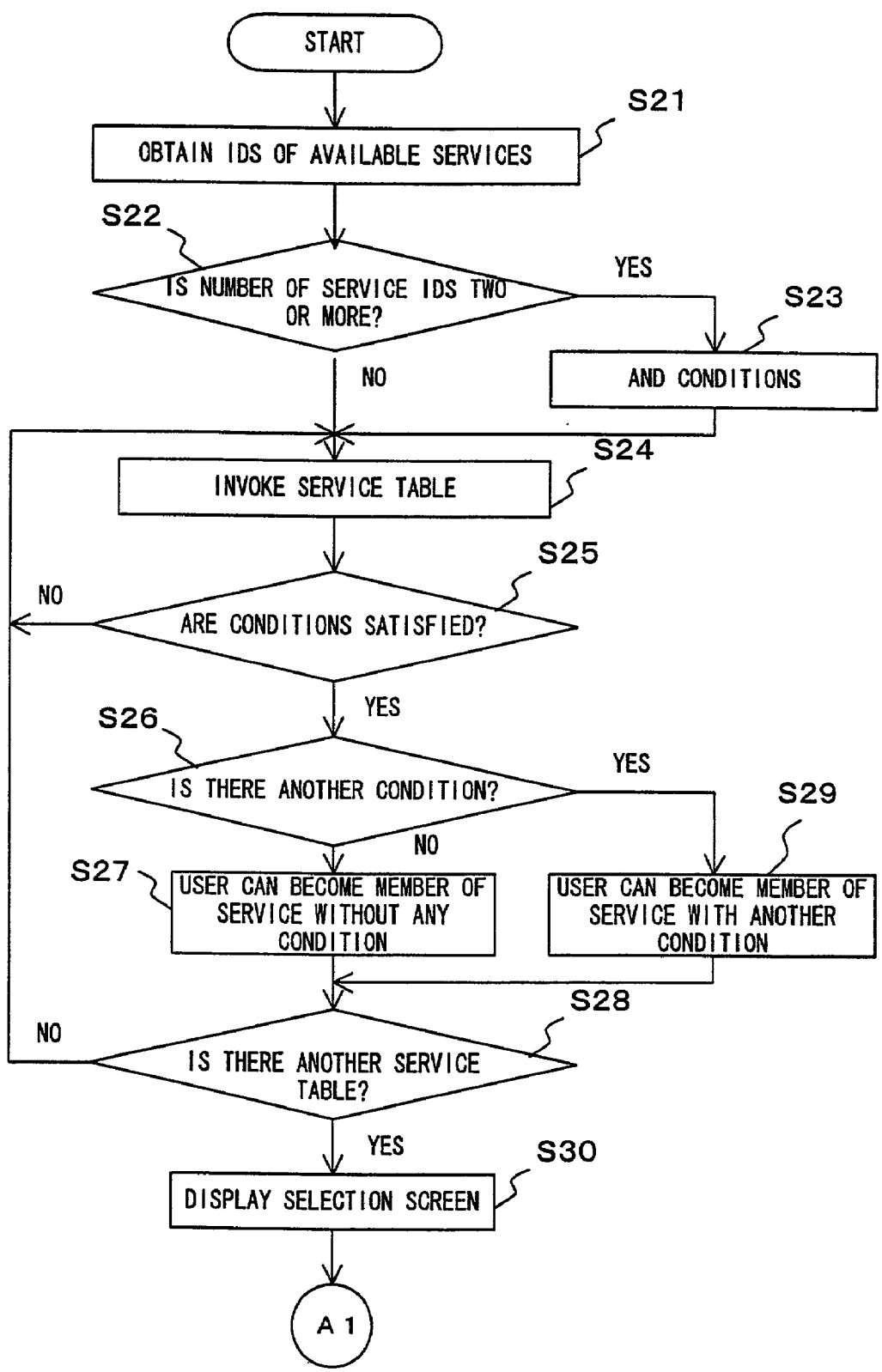
FIG. 15 is a first part of a flow chart showing a service displaying process.
Figure 16:
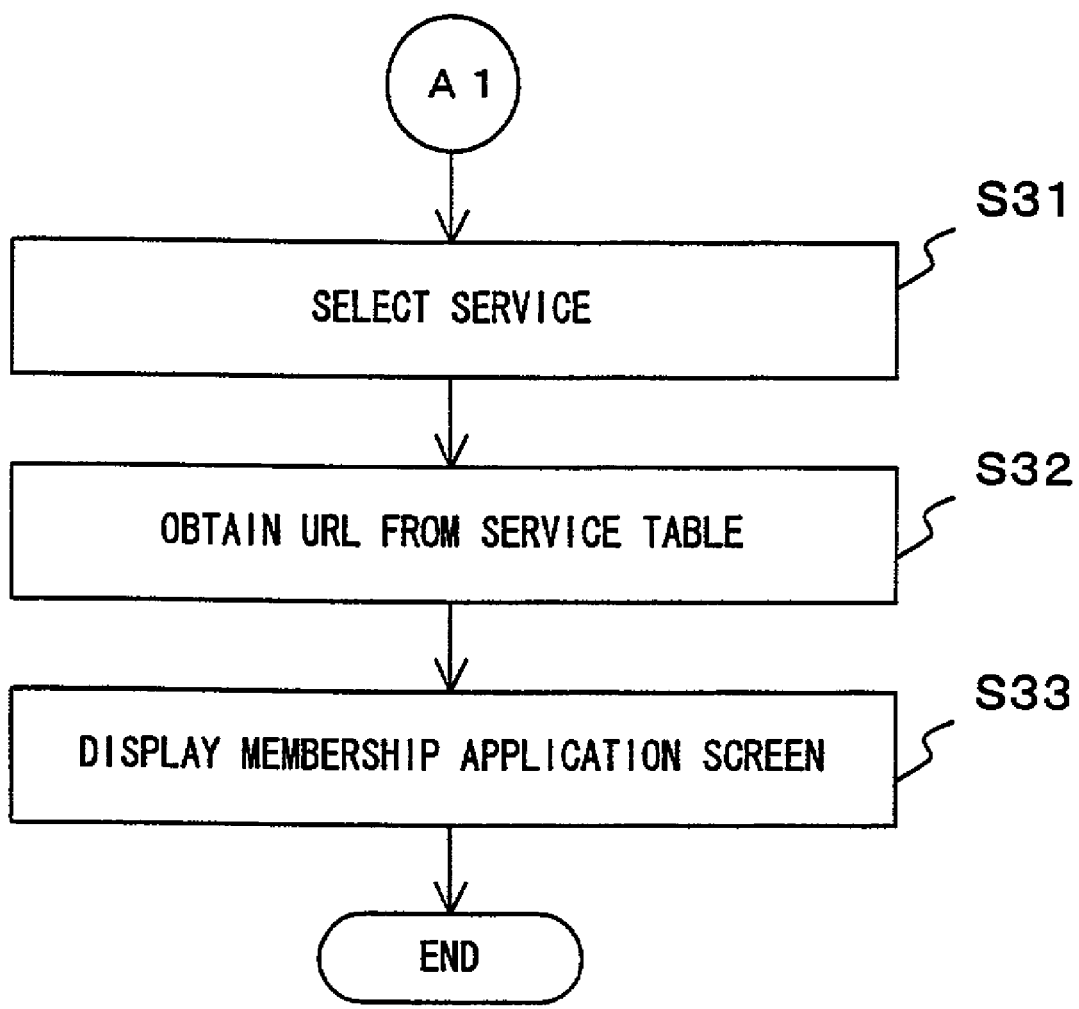
FIG. 16 is a second part of the flow chart shown in FIG. 15.

FIGS. 15 and 16 are a first part and a second part of a flow chart showing the available membership service displaying process performed by the certificate managing portion 51 of the server 42. The certificate managing portion 51 references to a relevant available service management table of the certificate management DB 35 corresponding to a serial number of a common certificate presented by the user and obtains registered service IDs (at step S21 in FIG. 15).

Thereafter, the certificate managing portion 51 determines the number of obtained service IDs (at step S22). Those service IDs represent that the user has become members thereof. When the determined result at step S22 is Yes (namely, there are a plurality of service IDs), the certificate managing portion 51 references the service management DB 52, extracts membership qualification conditions from the relevant service tables corresponding to the service IDs, and ANDs the membership qualification conditions of the services (at step S23). The certificate managing portion 51 records the resultant conditions as membership qualification conditions of services of which the user has become members (hereinafter those services are referred to as joined services).

Thereafter, the certificate managing portion 51 evokes one of the service tables of the services of which the user has not become members (hereinafter those services are referred to as non-joined services) (at step S24). The certificate managing portion 51 compares the conditions of the joined service with the conditions of the non-joined service (at step S25). When the determined result at step S25 is No (namely, the conditions of the joined service do not satisfy the conditions of the non-joined service), the certificate managing portion 51 repeats the process from step S24.

When the determined result at step S25 is Yes (namely, the conditions of the joined service satisfy the conditions of the non-joined service), the certificate managing portion 51 determines whether or not the evoked service table contains another membership qualification condition (at step S26) When the determined result at step S26 is No (namely, the service table does not contain another membership qualification condition), the certificate managing portion 51 determines that the user can immediately become a member of the service and records the category, name, and summary of the non-joined service to a table for services without any condition in a buffer area of the memory (at step S27).

Thereafter, the certificate managing portion 51 determines whether or not there is a service table of a non-joined service. When the determined result at step S28 is Yes (namely, there is a service table of a non-joined service), the certificate managing portion 51 repeats the process from step S24. When the determined result at step S26 is Yes (namely, the service table contains another condition), the certificate managing portion 51 determines that the user can become a member of the service with the condition and stores the category, name, and summary of the non-joined service and the condition to a table for services with conditions (at step S29). Thereafter, the certificate managing portion 51 repeats the process from step S28.

When the determined result at step S28 is Yes (namely, there is no service table of a non-joined service), the certificate managing portion 51 displays the contents of the tables generated at steps S27 and S29 as the service selection screen as shown in FIG. 17 on the user terminal unit 50 (at step S30).

The service selection screen shown in FIG. 17 displays services of which the user has become members and services of which the user can become members. The services of which the user can become members are divided into services of which the user can become members without any condition and services of which the user can become with a condition.

On such a service selection screen, when the user selects a non-joined service (at step S31 in FIG. 16), the certificate managing portion 51 references a relevant service table, obtains a service application URL, and sends the obtained URL to the user terminal unit 50 (at step S32). Thus, the user's screen is jumped to the site of the selected service. The user terminal unit 50 displays the membership application screen (at step S33). Thereafter, the user requests the site for the application of the membership of the service corresponding to the instructions of the membership application screen.

Instead of requesting the site for the application of the membership of the service on the membership application screen, the user can send a membership inquiry e-mail to the site of the selected service. In that case, at steps S32 and S33, the certificate managing portion 51 obtains the membership inquiry e-mail address from the relevant service table and displays it on the user terminal unit.

In the available membership service displaying process, before taking a membership qualification, the user can obtain a list of available non-joined services. Thus, without need to take membership qualifications for all non-joined services, the user can narrow services of which the user can become members. The user can select a desired service from the narrowed services.

Figure 18:
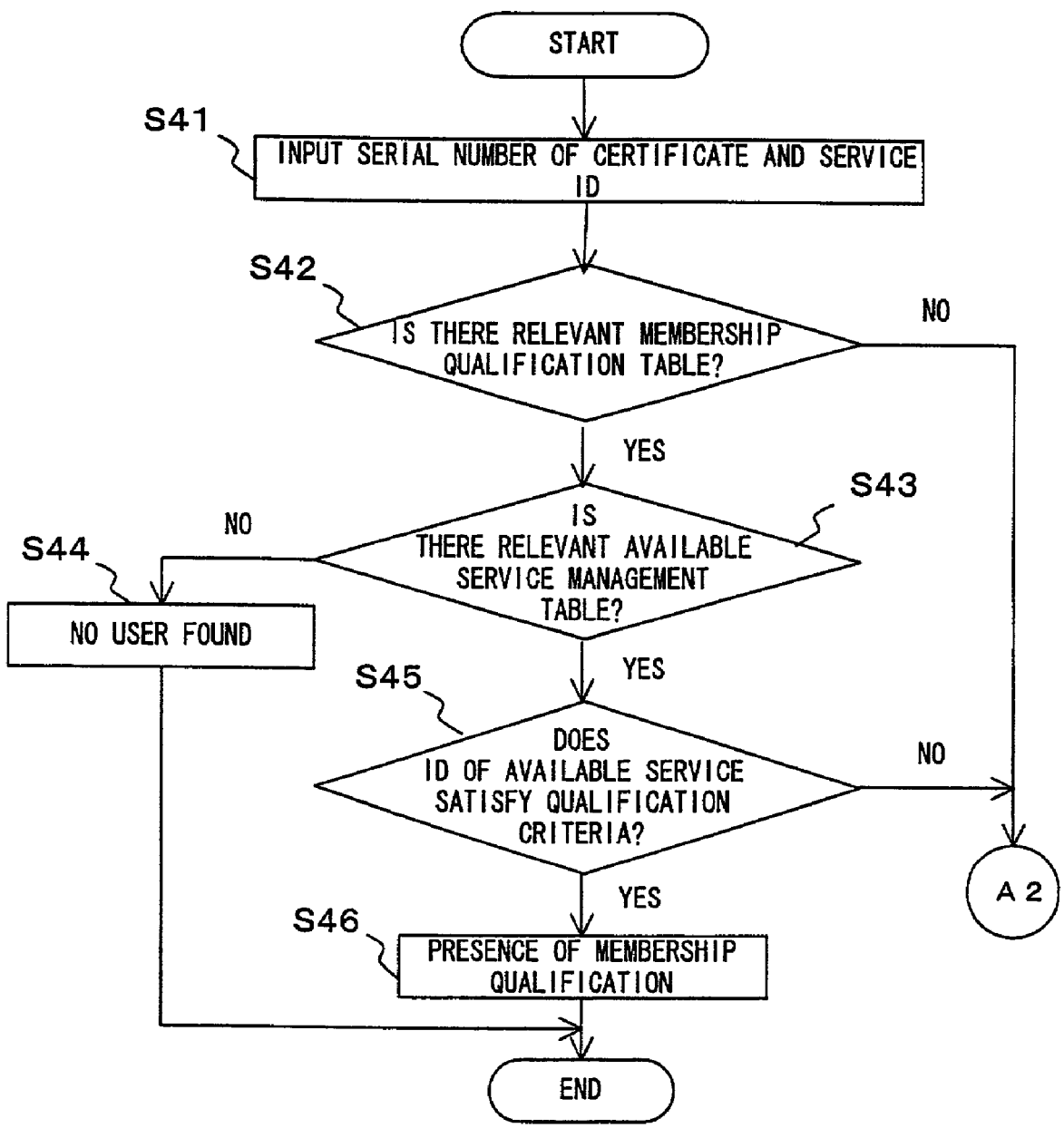
FIG. 18 is a first part of a flow chart showing a membership qualifying process.
Figure 19:
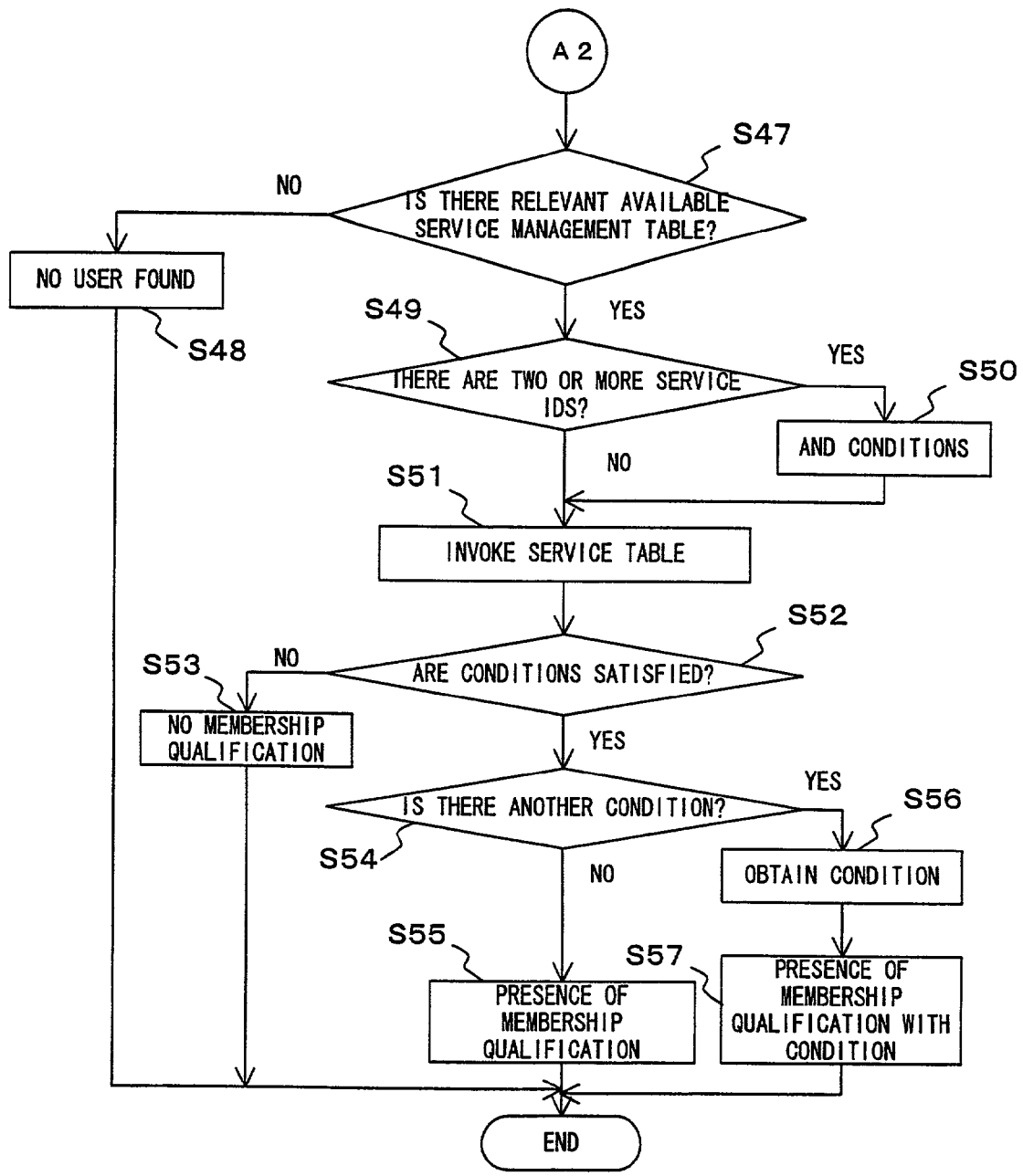
FIG. 19 is a second part of the flow chart shown in FIG. 18.

FIGS. 18 and 19 are a first part and a second part of a flow chart showing a membership qualifying process performed by the certificate managing portion 51, respectively. The certificate managing portion 51 displays a condition input screen as shown in FIG. 20 on a terminal unit of a service provider (for example, a server that provides a service) and prompts the service provider for membership qualification information (at step S41 in FIG. 18). Thus, the service provider inputs a serial number of a common certificate of a user who wants to become a member of the service and a service ID of the service.

Thereafter, the certificate managing portion 51 searches the service management DB 52 for a membership qualification table corresponding to the input service ID (at step S42). When the service provider pre-registers a membership qualification table, the certificate managing portion 51 evokes it.

Thereafter, the certificate managing portion 51 searches the certificate management DB 35 for an available service management table corresponding to the input serial number (at step S43). When the determined result at step S43 is No (namely, the certificate management DB 35 does not obtain the relevant available service management table), the certificate managing portion 51 displays a message that represents that the user cannot be found or that the user does not use the other service (at step S44). Thereafter, the certificate managing portion 51 completes the process.

Figure 21:
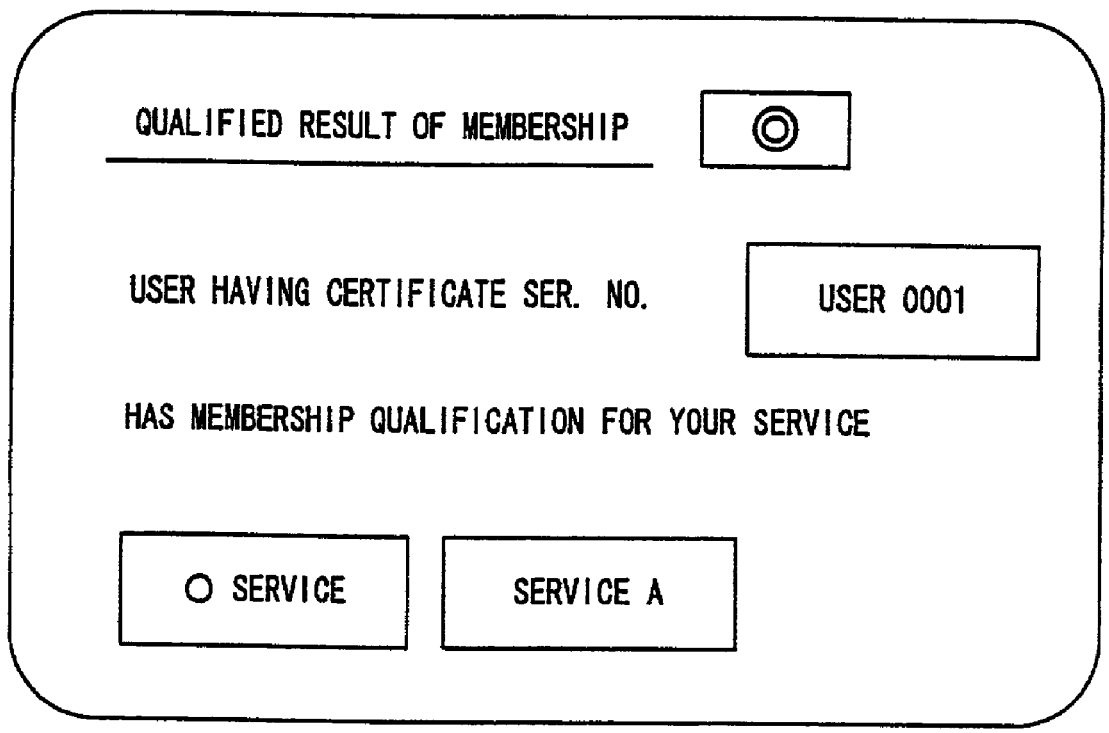
FIG. 21 is a schematic diagram showing a first determined result screen.

When the determined result at step S43 is Yes (namely, the certificate management DB 35 contains the relevant available service management table), the certificate managing portion 51 evokes it and compares the service ID registered in the available service management table with the qualification criteria of the membership qualification table (at step S45). When the determined result at step S45 is Yes (namely, the service ID satisfies the qualification criteria of the membership qualification table), the certificate managing portion 51 determines that the user has a membership qualification and displays a qualified result screen as shown in FIG. 21 (at step S46). Thereafter, the certificate managing portion 51 completes the process.

When the determined result at step S42 is No (namely, the service provider does not pre-register a membership qualification table), since the service management DB 52 does not contain a relevant membership qualification table, the flow advances to step S47 (shown in FIG. 19). In addition, when the determined result at step S45 is No (namely, the service ID does not satisfy the qualification criteria), the flow advances to step S47.

Steps S47 and S48 shown in FIG. 19 are the same as steps S43 and S44 shown in FIG. 18, respectively. In addition, steps S49 and S50 shown in FIG. 19 are the same as steps S22 and S23 shown in FIG. 15, respectively.

When the conditions of a joined service have been recorded at steps S49 and S50, the certificate managing portion 51 evokes a service table of a service corresponding to the service ID that has been input by the service provider (at step S51 in FIG. 19) and compares the conditions of the joined service with the conditions of the relevant service (at step S52).

Figure 22:
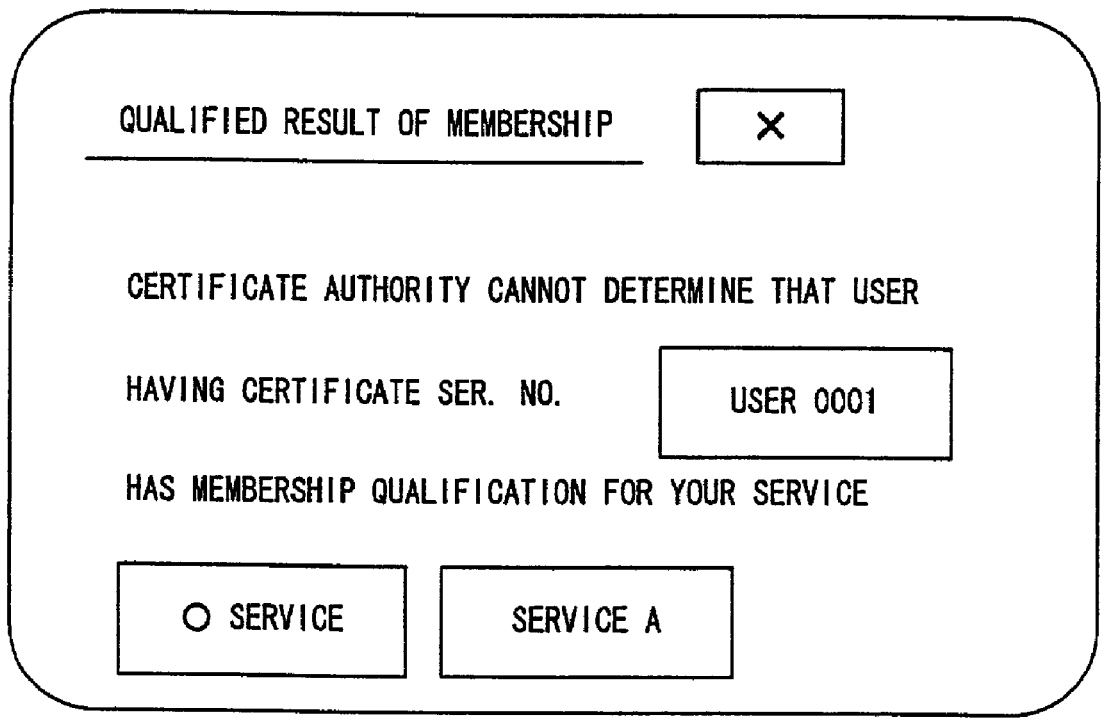
FIG. 22 is a schematic diagram showing a second determined result screen.

When the determined result at step S52 is No (namely, the conditions of the joined service do not satisfy the conditions of the relevant service), the certificate managing portion 51 determines that the user does not have a membership qualification for the service and displays a qualified result screen as shown in FIG. 22 (at step S53). Thereafter, the certificate managing portion 51 completes the process. The screen shown in FIG. 22 contains a message that represents that it cannot be determined that the user has a membership qualification for the service. The screen shown in FIG. 22 may contain a message that represents that to continue the membership qualification, the user should input his or her personal information.

When the determined result at step S52 is Yes (namely, the conditions of the joined service satisfy the conditions of the relevant service), the certificate managing portion 51 determines whether or not the service table contains another membership qualification condition (at step S54). When the determined result at step S54 is No (namely, the service table does not contain another membership qualification condition), the certificate managing portion 51 determines that the user has a membership qualification for the service and displays the qualified result screen as shown in FIG. 21 (at step S55). Thereafter, the certificate managing portion 51 completes the process.

Figure 23:
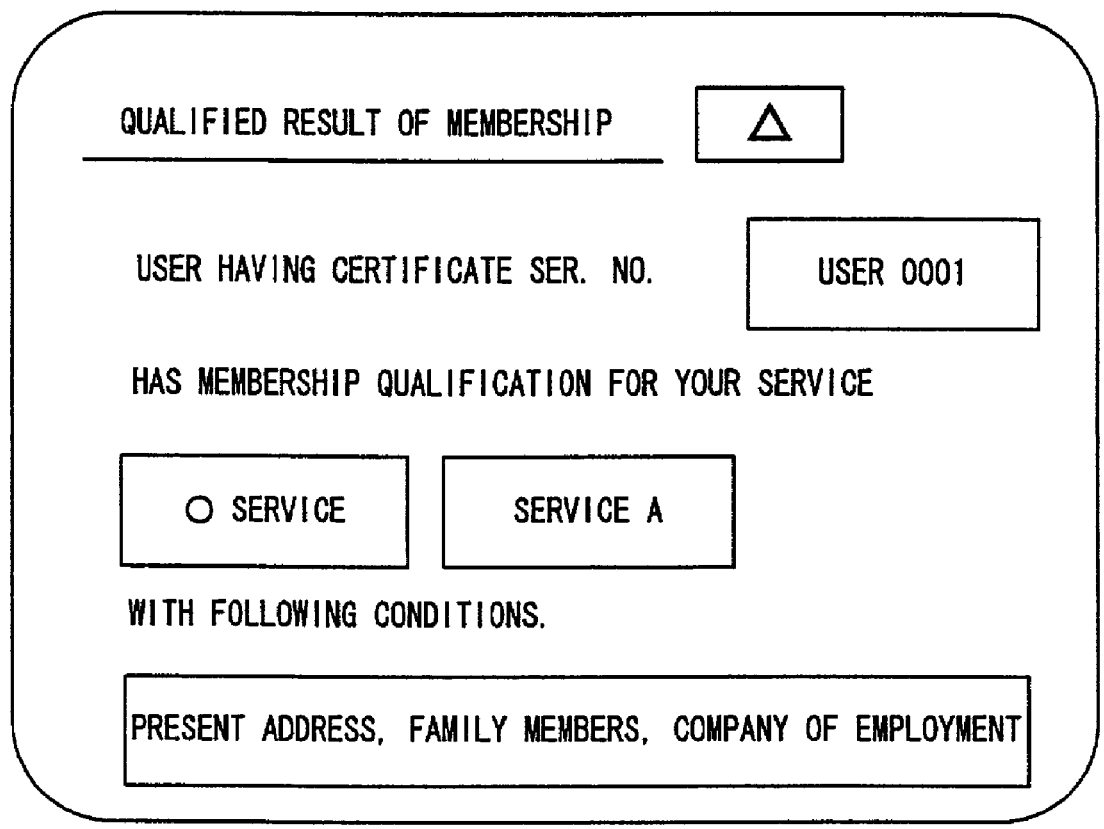
FIG. 23 is a schematic diagram showing a third determined result screen.

When the determined result at step S54 is Yes (namely, the service table contains another condition), the certificate managing portion 51 obtains the condition (at step S56) and determines that the user has a membership qualification for the service with a condition. Thereafter, the certificate managing portion 51 displays a qualified result screen as shown in FIG. 23 (at step S57). Thereafter, the certificate managing portion 51 completes the process. The screen shown in FIG. 23 represents that the other condition is an additional condition that the user should input.

When the certificate authority concentrically manages available membership services and a user becomes a member of a new service, the certificate authority qualifies a membership for the user on behalf of the service provider. Thus, the load of the service provider necessary for qualifying the membership alleviates. For example, when a user has a membership qualification for a bank service and an insurance service, a membership qualification of a credit card service for the user can be omitted.

Figure 24:
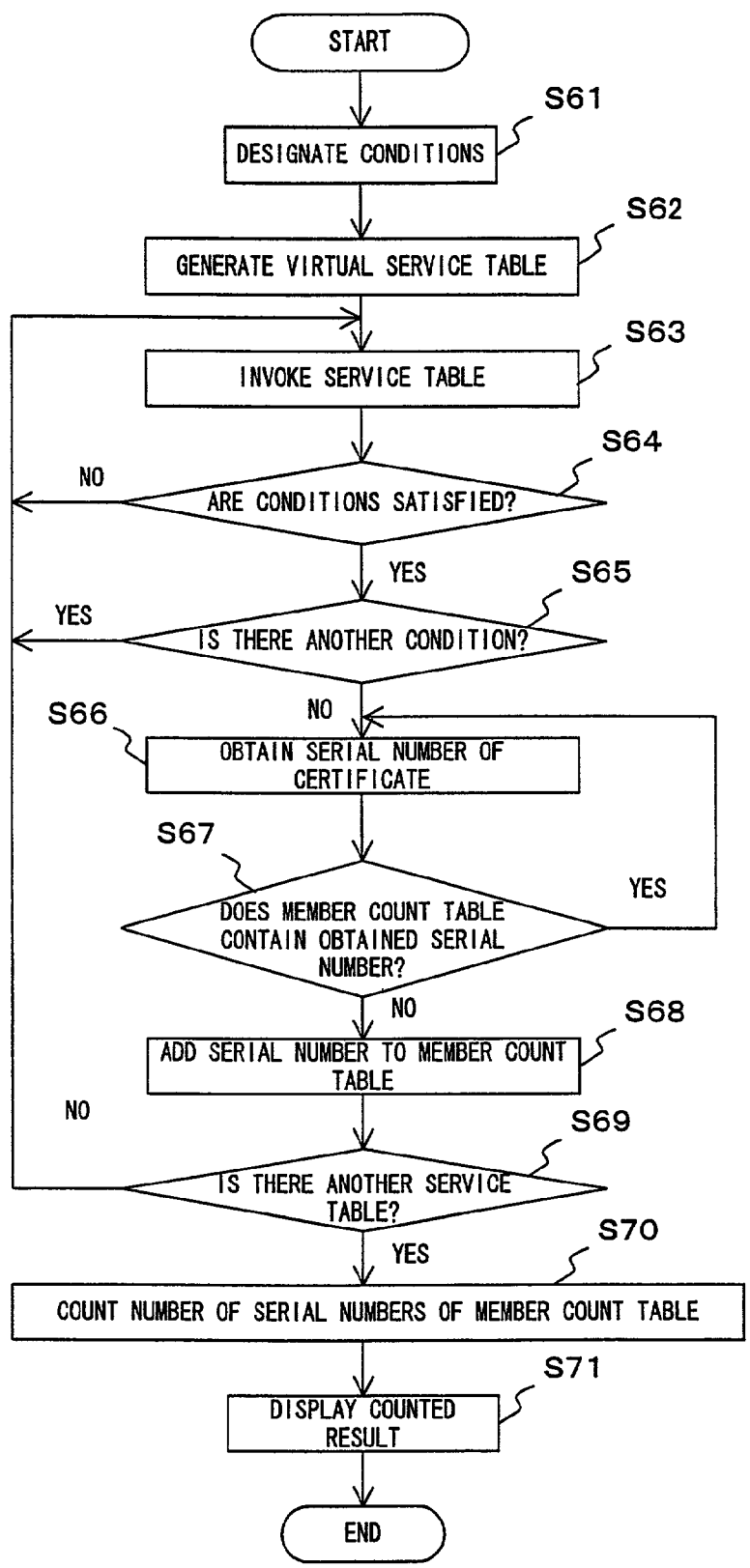
FIG. 24 is a flow chart showing a simulating process.

FIG. 24 is a flow chart showing a membership qualification condition simulating process performed by the certificate managing portion 51. First of all, the certificate managing portion 51 displays a simulation screen as shown in FIG. 2 on the terminal unit of the service provider and prompts the service provider for a membership qualification condition to be simulated (at step S61). Thus, the service provider inputs conditions such as sex, age, and annual income and then presses a simulation button 101.

The certificate managing portion 51 generates a virtual service table containing the input membership qualification conditions in a buffer area of the memory (at step S62) and evokes one service table from the service management DB 52 (at step S63). Thereafter, the certificate managing portion 51 compares the conditions of the virtual service table with the conditions of the service table that has been evoked from the service management DB 52 (at step S64). Hereinafter, the service table that has been evoked from the service management DB 52 is referred to as real service table.

When the determined result at step S64 is No (namely, the conditions of the virtual service table do not satisfy the conditions of the real service table), the certificate managing portion 51 repeats the process from step S63. When the determined result at step S64 is Yes (namely, the conditions of the virtual service table satisfy the conditions of the real service table), the certificate managing portion 51 determines whether or not the real service table contains another membership qualification condition (at step S65) When the determined result at step S65 is Yes (namely, the real service table contains another condition), the certificate managing portion 51 repeats the process from step S63.

When the determined result at step S65 is No (namely, the real service table does not contain another membership qualification condition), the certificate managing portion 51 searches the certificate management DB 35 for an available service management table that contains the service ID contained in the real service table and obtains a serial number of a common certificate from one of such available service management tables (at step S66). Thereafter, the certificate managing portion 51 determines whether or not a member count table as shown in FIG. 26 contains the serial number (at step S67). The member count table is placed in the buffer area of the memory (at step S67).

When the determined result at step S67 is Yes (namely, the member count table contains the serial number), the certificate managing portion 51 repeats the process from step S66. When the determined result at step S67 is No (namely, the member count table does not contain the serial number), the certificate managing portion 51 adds the serial number to the member count table. Thereafter, the certificate managing portion 51 determines whether or not there is another service table (at step S69). When the determined result at step S69 is Yes (namely, there is another service table), the certificate managing portion 51 repeats the process from step S63.

When the determined result at step S69 is Yes (namely, there is no service table), the certificate managing portion 51 counts the number of serial numbers contained in the member count table (at step S70) and displays the counted result on the simulation screen (at step S71). Thereafter, the certificate managing portion 51 completes the process.

The screen shown in FIG. 25 displays the number of serial numbers that have been counted as the number of users who can become members of the service corresponding to the input conditions as a percentage of the total of issued common certificates to the number of users who can become members of the service. When the service provider repeats the simulation by changing the input conditions, he or she can determine membership qualification conditions corresponding to a desired number of users. However, one of the number of uses who can become members of the service and the percentage may be displayed on the screen.

In the membership qualification condition simulating process, when the service provider starts a new service or changes membership qualification conditions of an existing service, the service provider can effectively designate membership qualification conditions while simulating the relation between membership qualification conditions and the number of members. Thus, the load of the service provider alleviates.

The servers 42 to 49 and the user terminal unit 50 shown in FIG. 10 can be composed of an information processing unit (computer) shown in FIG. 27. The information processing unit shown in FIG. 27 comprises a CPU (Central Processing Unit) 111, a memory 112, an input device 113, an output device 114, an external storing device 115, a medium driving device 116, and a network connecting device 117. These devices are connected by a bus 118.

The memory 112 includes for example a ROM (Read Only Memory) and a RAM (Random Access Memory) The memory 112 stores programs and data. The CPU 111 executes a program using the memory 112 so as to perform a desired process.

For example, the certificate managing portion 51, the membership screen controlling portion 61, and the charging managing portion 62 shown in FIG. 10 are stored as software components that are described as programs to the memory 112.

The input device 113 includes for example a keyboard, a pointing device, and a touch panel. The input device 113 is used to input a command and information. The input device 113 is used by the operator (a service provider or a user). The output device 114 includes for example a display device, a printer, and a speaker. The output device 114 is used to prompt a user for data and to output processed results.

The external storing device 115 is for example a magnetic disc device, an optical disc device, a magneto-optical disc device, or a tape device. The information processing unit stores the above-described programs and data to the external storing device 115. When necessary, the information processing unit loads the programs and data to the memory 112. The external storing device 115 may be used for the certificate management DB 35, the service management DB 52, the user management DB 63, the screen layout DB 64, and the charging information DB 65 shown in FIG. 10.

The medium driving device 116 drives a portable record medium 119 and accesses the contents thereof. The portable record medium 119 is for example a memory card, a floppy disk, a CD-ROM (Compact Disc Read Only Memory), an optical disc, or a magneto-optical disc from which any computer can read data. The operator stores the above-described programs and data to the portable record medium 119. When necessary, the operator loads the programs and data to the memory 112.

The network connecting device 117 is connected to any communication network such as Internet 41. The network connecting device 117 converts data so as to communicate with the communication network. The information processing unit receives the above-described programs and data from another device through the network connecting device 117. When necessary, the information processing unit loads the programs and data to the memory 112.

Figure 28:
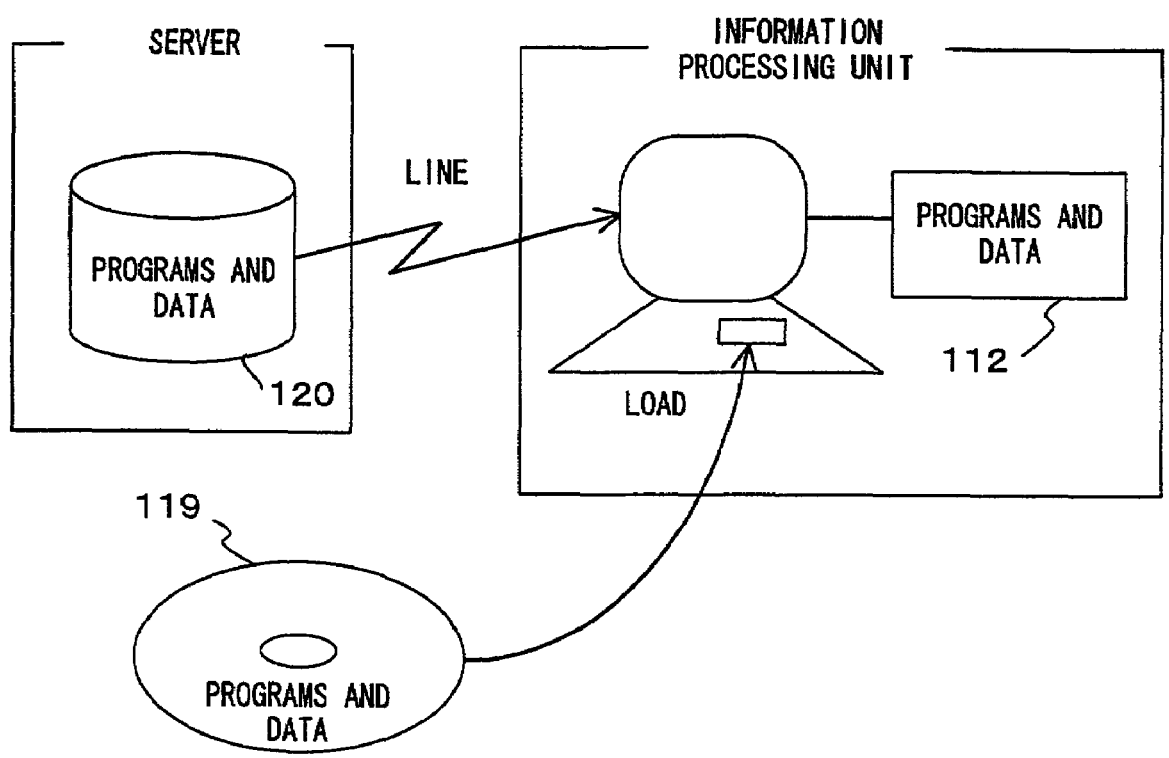
FIG. 28 is a schematic diagram showing a record medium.

FIG. 28 shows a record medium from which a computer can read a program and data and supply them to the information processing unit shown in FIG. 27. The programs and data stored in the portable record medium 119 and a database 121 of a server 120 are loaded to the memory 112. At that point, the server 120 generates a transfer signal for transferring programs and so forth and transmits them to the information processing unit through any transfer medium on the network. The CPU 111 executes the programs with the data so as to perform a required process.

According to the above-described embodiment, the digital certificate corresponding to ITU-T Specification X.509 is used as certification information. When necessary, certification information corresponding to another specification may be used.

According to the present invention, when a user selects one from a plurality of membership services, the user can effectively narrow available services. In addition, the service provider can effectively perform a membership qualification and designate conditions thereof. Thus, in the membership qualifying process, the loads of the user and the service provider alleviate.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A processing system, comprising:
a storing device storing a plurality of membership qualification tables of a plurality of independent services provided by a plurality of respective different organizations in a membership qualification system, each of the plurality of membership qualification tables including qualification criterion information for qualifying membership of a corresponding service and defining a prescribed service of which a user ought to be a member to have a membership qualification for the corresponding service, and identification information of a first service of the plurality of services being included by qualification criterion information for qualifying membership of a second service of the plurality of services for indicating the prescribed service;
a receiving device receiving information of a user for whom membership qualification is performed;
a first determining device determining, in response to the information of the user, whether the user is utilizing the first service when the user requests membership in the second service; and
a second determining device determining that the user has a membership qualification for the second service by referring to the membership qualification table of the second service and checking that the identification information of the first service is included in the qualification criterion information of the second service when the user is utilizing the first service.

2. The processing system as set forth in claim 1,
wherein said storing device stores a plurality of service tables of the services, each of which includes a membership condition of a corresponding service,
wherein said receiving device receives from the user a request to present an available membership service for the user, and
wherein said processing system further comprises:
a selecting device, in response to the request, extracting, from among the plurality of service tables, a first membership condition from a service table of a current service of which the user has become a member, and a second membership condition from at least one service table of at least one other service of which the user is not a member, in response to the request, comparing the first and second membership conditions, and selecting an eligible service of which the user can become a member; and
a presenting device presenting information to the user about the eligible service of which the user can become a member.

3. The processing system as set forth in claim 2, wherein when the user is a member of at least two services, said selecting device totals membership conditions of the at least two services using an AND operation and compares a totaled membership condition with the second membership condition of the service of which the user has not become a member.

4. The processing system as set forth in claim 3,
further comprising a registering device registering common certificate information that is in common with the at least two services, wherein said receiving device receives certificate information of the user, and
wherein, when the certificate information of the user corresponds to the common certificate information, said selecting device obtains the membership conditions of the at least two services based on the certificate information of the user.

5. The processing system as set forth in claim 1,
further comprising a registering device registering certificate information for a service that the user is utilizing,
wherein said receiving device receives identification information of the certificate information of the user, and
wherein when the identification information corresponds to the registered certificate information, said first determining device obtains information about the service that the user is utilizing based on the identification information and determines whether or not the user is utilizing the first service.

6. A computer-readable recording medium on which a program for a computer is recorded, said program, when executed by the computer, causing the computer to perform a method comprising:
receiving information of a user for whom membership qualification is performed;

determining whether the user is utilizing a first service in a membership qualification system using membership qualification tables of independent services provided by a plurality of respective different organizations, each of the membership qualification tables including qualification criterion information for qualifying membership of a corresponding service and defining a prescribed service of which a user ought to be a member to have a membership qualification for the corresponding service, when the user requests membership in a second service in the membership qualification system based on the identification information of the first service included in the qualification criterion information for qualifying membership of the second service; and determining that the user has a membership qualification for the second service by referring to the membership qualification table of the second service and checking that the identification information of the first service is included in the qualification criterion information of the second service when the user is utilizing the first service.

7. A computer-readable recording medium as set forth in claim 6, wherein by said receiving the computer receives from the user a request to present an available membership service for the user, and wherein said method further comprises:

extracting, in response to the request, from among a plurality of service tables of the services, each of which includes a first membership condition of a current service of which the user has become a member, and a second membership condition from at least one service table of at least one other service of which the user has not become a member;

comparing the first and second membership conditions;

selecting an eligible service of which the user can become a member; and presenting information to the user about the eligible service of which the user can become a member.

8. A processing method, comprising:

referencing qualification criterion information for qualifying membership of a first service in a membership qualification system using membership qualification tables of independent services provided by a plurality of respective different organizations, each of the membership qualification tables including qualification criterion information for qualifying membership of a corresponding service and defining a prescribed service of which a user ought to be a member to have a membership qualification for the corresponding service, when a user requests membership in the first service;

receiving information of a user for whom membership qualification is performed;

determining, in response to the information of the user, whether the user is utilizing a second service in the membership qualification system based on the identification information of the second service included in the qualification criterion information;

determining that the user has a membership qualification for the first service by referring to the membership qualification table of the first service and checking that the identification information of the second service is included in the qualification criterion information of the first service when the user is utilizing the second service; and displaying a qualification result on a screen.

9. The processing method as set forth in claim 8, wherein said storing includes storing a plurality of service tables of the services, each of the service tables including a membership condition of a corresponding service, wherein said receiving includes receiving from the user a request to present an available membership service for the user, wherein said processing method further comprises:

extracting, in response to the request, from among the plurality of service tables, a first membership condition from a service table of a current service of which the user has become a member and a second membership condition from at least one service table of at least one other service of which the user has not become a member;

comparing the first and second membership conditions; and selecting an eligible service of which the user can become a member, and wherein said displaying includes displaying information about the eligible service of which the user can become a member on the screen.

\* \* \* \* \*